United States Patent
Khan

(10) Patent No.: US 11,448,719 B2
(45) Date of Patent: Sep. 20, 2022

(54) OBTAINING FINGERPRINTS FOR INDOOR NAVIGATION SYSTEMS

(71) Applicant: HERE Global B.V., Eindhoven (NL)

(72) Inventor: Muhammad Irshan Khan, Tampere (FI)

(73) Assignee: HERE Global B.V., Eindhoven (NL)

( * ) Notice: Subject to any disclaimer, the term of this patent is extended or adjusted under 35 U.S.C. 154(b) by 310 days.

(21) Appl. No.: 16/638,521

(22) PCT Filed: Aug. 14, 2017

(86) PCT No.: PCT/EP2017/070629
§ 371 (c)(1),
(2) Date: Feb. 12, 2020

(87) PCT Pub. No.: WO2019/034240
PCT Pub. Date: Feb. 21, 2019

(65) Prior Publication Data
US 2020/0371192 A1    Nov. 26, 2020

(51) Int. Cl.
| | |
|---|---|
| *G01S 11/02* | (2010.01) |
| *G01S 5/02* | (2010.01) |
| *H04B 17/318* | (2015.01) |
| *G01C 21/20* | (2006.01) |

(52) U.S. Cl.
CPC ........ *G01S 5/02525* (2020.05); *G01C 21/206* (2013.01); *G01S 11/02* (2013.01); *H04B 17/318* (2015.01)

(58) Field of Classification Search
CPC .... G01S 11/02; G01S 5/02525; H04B 17/318
USPC .......................................................... 342/451
See application file for complete search history.

(56) References Cited

U.S. PATENT DOCUMENTS

| | | | |
|---|---|---|---|
| 8,811,189 B2 | 8/2014 | Pandev et al. | |
| 9,232,494 B1 | 1/2016 | Shin et al. | |
| 2012/0046045 A1* | 2/2012 | Gupta | G01S 5/0252 455/456.1 |

(Continued)

FOREIGN PATENT DOCUMENTS

| | | | | |
|---|---|---|---|---|
| CA | 2974031 A1 * | 1/2018 | .......... | G01S 5/0252 |
| CN | 103702338 A * | 4/2014 | .......... | G01S 5/0252 |

(Continued)

OTHER PUBLICATIONS

International Search Report and Written Opinion for Application No. PCT/EP2017/070629 dated Apr. 30, 2018, 11 pages.

(Continued)

*Primary Examiner* — Harry K Liu
(74) *Attorney, Agent, or Firm* — Alston & Bird LLP

(57) ABSTRACT

A method, apparatus, computer readable storage medium and system are disclosed for generating a radio map for indoor navigation and/or floor detection. The method includes obtaining one or more first fingerprints, which stem from one or more radio nodes comprised by an infrastructure of a venue. The one or more radio nodes are surrounding the first apparatus so that the first apparatus is located within each respective coverage area of the one or more radio nodes. The method also includes generating a radio map based at least partially on the one or more first fingerprints; and outputting the generated radio map.

17 Claims, 7 Drawing Sheets

(56) References Cited

U.S. PATENT DOCUMENTS

| 2012/0329479 | A1* | 12/2012 | Wirola | H04W 4/02 |
| | | | | 455/456.1 |
| 2013/0267257 | A1 | 10/2013 | Palanki et al. | |
| 2016/0161592 | A1 | 6/2016 | Wirola et al. | |
| 2017/0272911 | A1* | 9/2017 | Agrawal | H04L 61/6022 |
| 2019/0268718 | A1* | 8/2019 | Choi | H04W 4/026 |

FOREIGN PATENT DOCUMENTS

| CN | 103813451 A | * | 5/2014 | | |
| CN | 106 028 290 A | | 10/2016 | | |
| GB | 2549983 A | * | 11/2017 | | G01S 5/021 |
| KR | 102134414 B1 | * | 8/2017 | | |
| WO | WO 2012/052700 A1 | | 4/2012 | | |
| WO | WO 20157150344 A1 | | 10/2015 | | |
| WO | WO-2021096242 A1 | * | 5/2021 | | |

OTHER PUBLICATIONS

Atia, M. M. et al., *Dynamic Online-Calibrated Radio Maps for Indoor Positioning in Wireless Local Area Networks*, IEEE Transactions on Mobile Computing, vol. 12, No. 9 (Sep. 2013) 1774-1787.

Jamaa, M. B. et al., *EasyLoc: RSS-Based Localization Made Easy*, Procedia Computer Science 10 (2012) 1127-1133.

Lim, H. et al., *Zero-Configuration Robust Indoor Localization: Theory and Experimentation*, IEEE (2006) 1-12.

Zou, H. et al., *WinIPS: Wifi-Based Non-Intrusive IPS For Online Radio Map Construction*, IEEE Infocom 2016 Poster Presentation (2016) 2 pages.

* cited by examiner

OBTAINING FINGERPRINTS FOR INDOOR NAVIGATION SYSTEMS

CROSS-REFERENCE TO RELATED APPLICATIONS

This application is a national phase entry of International Application No. PCT/EP2017/070629, filed Aug. 14, 2017, the entire contents of which are incorporated herein by reference.

FIELD

The following disclosure relates to the field of indoor navigation respectively positioning systems, or more particularly relates to systems, apparatuses, and methods for obtaining fingerprints for such systems.

BACKGROUND

Indoor positioning requires novel systems and solutions that are specifically developed and deployed for this purpose. The "traditional" positioning technologies, which are mainly used outdoors, for instance satellite and cellular positioning technologies, cannot deliver such performance indoors that would enable seamless and equal navigation experience in both environments.

The required positioning accuracy (within 2 to 3 meters), coverage (~100%) and floor detection are challenging to achieve with satisfactory performance levels with the systems and signals that were not designed and specified for the indoor use cases in the first place. Satellite-based radio navigation signals simply do not penetrate through the walls and roofs for the adequate signal reception and the cellular signals have too narrow bandwidth for accurate ranging by default.

Several indoor-dedicated solutions have already been developed and commercially deployed during the past years, for instance solutions based on pseudolites (Global Positioning System (GPS)—like short-range beacons), ultrasound positioning, Bluetooth Low Energy (BLE) signals (e.g. High-Accuracy Indoor Positioning, HAIP) and Wi-Fi fingerprinting. What is typical to these solutions is that they require either deployment of totally new infrastructure (radio nodes or radio beacons, or tags to name but a few non-limiting examples) or manual exhaustive radio surveying of the buildings including all the floors, spaces and rooms. This is rather expensive and will take a considerable amount of time to build the coverage to the commercially expected level, which in some cases narrowed the potential market segment only to very thin customer base, for instance for health care or dedicated enterprise solutions. Also, the diversity of these technologies makes it difficult to build a globally scalable indoor positioning solution, and the integration and testing will become complex if a large number of technologies needs to be supported in the consumer devices (e.g. smartphones).

For an indoor positioning solution to be commercially successful, that is, i) being globally scalable, ii) having low maintenance and deployment costs, and iii) offering acceptable end-user experience, the solution needs to be based on an existing infrastructure in the buildings and on existing capabilities in the consumer devices. This leads to an evident conclusion that the indoor positioning needs to be based on Wi-Fi- and/or Bluetooth (BT)-technologies that are already supported in every smartphone, tablet, laptop and even in the majority of feature phones. It is, thus, required to find a solution that uses the Wi-Fi- and BT-radio signals in such a way that makes it possible to achieve 2 to 3 meter horizontal positioning accuracy, close to 100% floor detection with the ability to quickly build the global coverage for this approach.

Further, a novel approach for radio-based indoor positioning that models for instance the Wi-Fi-radio environment (or any similar radio e.g. Bluetooth) from observed Received Signal Strength (RSS)—measurements as two-dimensional radio maps and is hereby able to capture the dynamics of the indoor radio propagation environment in a compressible and highly accurate way. This makes it possible to achieve unprecedented horizontal positioning accuracy with the Wi-Fi signals only within the coverage of the created radio maps and also gives highly reliable floor detection. However, the radio maps need to be currently surveyed manually, which is blocking rapid global scalability.

Huge volumes of indoor Wi-Fi measurements data could be harvested via crowd-sourcing if the consumer devices were equipped with the necessary functionality to enable the Wi-Fi data collection as a background process, naturally with the end-user consent. It could also be possible to use volunteers to survey the sites (e.g. buildings) in exchange of reward or recognition and get the coverage climbing up globally in the places and venues important for the key customers. However, the technical challenges related to the harvesting, processing, redundancy, ambiguity and storing the crowd-source data need to be understood and solved first, before the Wi-Fi radio map creation can be based on the machine learning of the indoor Wi-Fi radio maps.

SUMMARY

Radio surveying may take significant time in order to achieve a preferably complete radio map of a venue (e.g. two dimensional and optionally one or more floors of entire venue). Such a radio map may enable accurate indoor positioning estimation and floor detection based on a comparison of a gathered radio measurement with those of the radio map. Once such a radio map is obtained, the radio map does not adapt to changes (e.g. additional walls are added to the venue) of the venue. Such changes decrease positioning and/or floor detection performance.

It is thus, inter alia, an object of the invention to obtain fingerprints for a radio map of a venue in a quick and efficient way, and which can be adaptive to changes of the venue so that no exhaustive surveying of the venue to obtain such fingerprints is needed.

According to a first exemplary embodiment of the present invention, a method is disclosed, the method comprising:
  obtaining one or more first fingerprints, which stem from one or more radio nodes comprised by an infrastructure of a venue, and wherein the one or more radio nodes are surrounding the first apparatus so that the first apparatus is located within each respective coverage area of the one or more radio nodes;
  generating a radio map based at least partially on the one or more first fingerprints; and
  outputting the generated radio map.

This method may for instance be performed and/or controlled by a first apparatus and/or an electronic device, e.g. a so-called center device terminal. For instance, the method may be performed and/or controlled by using at least one processor of the electronic device.

According to a second exemplary embodiment of the present invention, a method is disclosed, the method comprising:

gathering one or more respective radio measurements in a venue, wherein one or more respective signals are sent by one or more respective radio nodes surrounding the second apparatus, wherein each respective radio measurement of the one or more respective radio measurements is indicative of at least one respective piece of identifier information which is associated with the one or more respective radio nodes surrounding the second apparatus, and wherein each of the one or more radio nodes surrounding the respective radio node is uniquely identifiable based at least partially on the at least one respective piece of identifier information; and broadcasting the one or more respective radio measurements.

This method may for instance be performed and/or controlled by a second apparatus, e.g. a radio node. For instance, the method may be performed and/or controlled by using at least one processor of the apparatus.

According to a further exemplary aspect of the invention, a computer program is disclosed, the computer program when executed by a processor causing an electronic device, for instance a center device, and/or an apparatus, for instance a radio node, to perform and/or control the actions of the method according to the first and/or second exemplary embodiment.

According to a further exemplary aspect of the invention, a computer program is disclosed, the computer program when executed by a processor causing an electronic device, for instance a center device, and/or an apparatus, for instance a radio node, to perform and/or control the actions of the method according to the first and/or second exemplary embodiment.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an electronic device is disclosed, configured to perform and/or control or comprising respective means for performing and/or controlling the method according to the first exemplary embodiment.

The means of the electronic device can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an electronic device is disclosed, comprising at least one processor and at least one memory including computer program code, the at least one memory and the computer program code configured to, with the at least one processor, cause an electronic device, for instance the electronic device, at least to perform and/or to control the method according to the first exemplary embodiment.

The above-disclosed electronic device may be a module or a component for a device, for example a chip. Alternatively, the disclosed electronic device according to any aspect of the invention may be a device, for instance a mobile terminal. The disclosed electronic device according to any aspect of the invention may comprise only the disclosed components, for instance means, processor, memory, or may further comprise one or more additional components.

According to a further exemplary aspect of the invention, an apparatus is disclosed, configured to perform and/or control or comprising respective means for performing and/or controlling the method according to the second exemplary embodiment.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause a radio node, for instance the radio node, at least to perform and/or to control the method according to the second exemplary embodiment.

The above-disclosed apparatus may be a module or a component for a device, for example a chip. Alternatively, the disclosed radio node according to any aspect of the invention may be a device, for instance a radio node. The disclosed apparatus according to any aspect of the invention may comprise only the disclosed components, for instance means, processor, memory, or may further comprise one or more additional components.

According to a third exemplary aspect of the invention, a system is disclosed, comprising:

at least one electronic device according to the first aspect of the present invention as disclosed above, and at least one apparatus according to the second exemplary aspect of the present invention as disclosed above.

According to a further exemplary aspect of the invention, a system is disclosed, comprising:

at least one electronic device according to the first aspect of the present invention as disclosed above, at least one apparatus according to the second exemplary aspect of the present invention as disclosed above, and at least one terminal, wherein the terminal is configured to receive a generated radio map, e.g. for performing indoor positioning respectively navigation and/or floor detection.

In the following, exemplary features and exemplary embodiments of all aspects of the present invention will be described in further detail.

The first apparatus may for instance be an electronic device, also referred to as a central device. The electronic device may for instance be portable (e.g. weigh less than 5, 4, 3, 2, or 1 kg). Alternatively, the electronic device may for instance be stationary, e.g. it may be comprised by the infrastructure of the venue. The electronic device may for instance comprise or be connectable to a display for displaying a radio map, e.g. the generated radio map. The electronic device may for instance comprise or be connectable to means for outputting sound, e.g. in the form of spoken commands or information. The electronic device may for instance comprise or be connectable to one or more sensors for determining the electronic devices position, such as for instance a Global Navigation Satellite System (GNSS) receiver, e.g. in the form of a Global Positioning System (GPS) receiver. Alternatively or additionally, the position of the electronic device may for instance be known by the electronic device, e.g. a piece of position information may for instance be stored in a memory comprised or accessible by the electronic device. The position of the electronic device may for instance be known in case it is a stationary device and comprised by the infrastructure of the venue, e.g. the electronic device is permanently installed in the venue.

The electronic device may for instance comprise a transceiver, e.g. according to the WLAN and/or BLE standard to provide wireless-based communication. Further, the electronic device may for instance use such a transceiver for transmitting and/or receiving obtained one or more first and optionally gathered one or more second fingerprints to other electronic devices, or to entities that are different from the electronic devices (e.g. server or server cloud). The electronic device may is located within the coverage area of the one or more radio nodes of the venue. In case, a respective electronic device is locatable in the venue to be able to receive one or more signals of each radio node of the infrastructure of the venue, one electronic device may be sufficient. In case one electronic device is not sufficient to receive one or more signals of each radio node of the infrastructure, an additional electronic device or more than one additional electronic devices may for instance be needed. Such a case may take place e.g. if the venue is large in size, e.g. like a station, an airport, a shopping mall, a university or the like to name but a few non-limiting examples.

The infrastructure of the venue may for instance comprise one or more radio nodes (e.g. beacons for indoor positioning and/or for floor detection according to the BLE specification, and/or Wi-Fi Access Points for indoor positioning and/or for floor detection according to the WLAN (Wireless Local Area Network) specification). A beacons radio map may for instance be used for indoor positioning as well as for floor detection. For instance, floor detection may be done by estimating a floor based on a radio map. Further, the infrastructure of the venue may for instance comprise one or more electronic devices, which are located in the venue as well. The one or more radio nodes may for instance be permanently installed in the venue.

The venue may for instance be a building, shopping mall, office complex, public accessible location (e.g. station, airport, university or the like) to name but a few non-limiting examples.

Each respective first fingerprint of the one or more first fingerprints may for instance be gathered by obtaining a piece of position information (e.g. determining a horizontal location respectively position and optionally a vertical location respectively position) and by measuring signals transmitted by one or more radio nodes, which are receivable at the horizontal location and optionally at the vertical location the respective radio node is located within the venue during the gathering of the fingerprint. For example, one or more barometric sensors may be used for measuring signals associated with a vertical location. At least one barometric measurement at a reference vertical point can be compared with at least one measurement of the one or more barometric sensors to estimate a vertical location (e.g. height/altitude). Further, one or more radio propagation models with a known vertical location may be used to estimate a vertical location.

Each respective first fingerprint of the one or more first fingerprints stems from one or more radio nodes. Each respective first fingerprint of the one or more first fingerprints stems from one or more radio nodes in case each respective radio node e.g. gathered (e.g. determined) a first fingerprint and transmits that gathered first fingerprint so that said transmitted first fingerprint can be obtained, e.g. by the first apparatus.

A piece of position information, which may for instance be comprised by each respective fingerprint, may for instance be indicative of a horizontal position and additionally of a vertical position (e.g. floor, altitude, height to name but a few non-limiting examples) of a venue. The piece of position information may for instance comprise at least one pair of latitude/longitude coordinates, and additionally an altitude, or x-, y-coordinates, and additionally a floor level of the venue (e.g. an altitude, a height, or a z-coordinate).

The radio nodes of the infrastructure of the venue may for instance transmit one or more signals comprising at least an identifier of said radio node. In case the one or more transmitted signals of the one or more radio nodes are received, the one or more radio nodes may for instance be identified based at least partially on the identifier comprised by the one or more signals.

One or more electronic devices, e.g. according to the first exemplary embodiment of the present invention, comprised by the infrastructure of the venue as used herein refer to the infrastructure of the venue, which is used for enabling indoor positioning and/or floor detection. Radio nodes ("basic" radio nodes), which do not comprise any additional features (e.g. which may not broadcast one or more respective radio measurements), in particular within the meaning of the invention, may for instance be used as well, e.g. by obtaining (e.g. determining) a fingerprint of one or more signals transmitted by these "basic" radio nodes as well, e.g. by the first apparatus. Further, one or more radio nodes, e.g. according to the second exemplary embodiment of the present invention, comprised by the infrastructure of the venue as used herein refer to the infrastructure of the venue, which is used for enabling indoor positioning and/or floor detection to be performed. These one or more radio nodes may for instance also be referred to as "mirror beacons". Thus, comprised by the infrastructure of the venue refers to technical parts and/or devices comprised by the venue enabling indoor positioning and/or floor detection and/or used by indoor positioning systems and/or floor detection systems to be performed.

More than one first apparatuses (e.g. central devices) may for instance be used in a system according to the third exemplary aspect of the present invention.

An area of the venue may for instance be a pre-defined or determined according to pre-defined rules part (e.g. of a predefined size and shape (e.g. quadratic)) of the venue. Indoor positioning and/or floor detection may for instance be performed in said area of the venue, in case corresponding infrastructure (e.g. one or more radio nodes and one or more electronic devices) are comprised (e.g. (permanently) installed) in said area of the venue.

The radio map may for instance represent a map of a venue, or at least a part (e.g. region or area) of the map of the venue. These parts of the map of the venue may for instance be parts of a larger radio map. These parts may for instance pertain to different venues, or one or more different floors of a venue. The map of the venue may have been divided, e.g. by a regular grid (the parts of the venue may then for instance be (e.g. quadratic) tiles). The radio map as used herein refers to a map (e.g. of the venue) comprising or being associated with fingerprints, which are mapped respectively associated with horizontal positions located within the venue represented by the map. Based on a comparison of the fingerprints comprised by or associated with the radio map and a gathered (e.g. measured) by a terminal) radio measurement, indoor positioning and/or floor detection may for instance be performed.

The radio map may for instance be available to the first apparatus by being stored in or at the first apparatus, or by being accessible by the first apparatus, e.g. via a wireless or wire-bound connection e.g. to a further apparatus that stores the radio map (e.g. a server or a server cloud). This further apparatus may be remote from the first apparatus or may be included with first apparatus into one device.

The radio map is outputted. The radio map may for instance be outputted by being provided or caused providing (e.g. to a server, or to one or more electronic devices of the infrastructure of the venue, or to another apparatus that transfers the radio map to the server or to the one or more electronic devices). Alternatively or additionally, one or more fingerprints, one or more respective radio measurements, and/or one or more radio maps may for instance be relayed, e.g. to the server, e.g. from the first apparatus having connectivity to the server. Further, e.g. for a real-time performance, the radio map may for instance be outputted to a terminal, which terminal may for instance request an indoor positioning process (e.g. location estimation within a venue) to be performed and/or controlled. The radio map may for instance be provided to the terminal, or be caused providing to the terminal, e.g. a server transfers the radio map to the terminal. The radio map may for instance be used for indoor navigation respectively positioning processes, and/or for a floor detection within a venue, e.g. performed and/or controlled by a positioning library, e.g. of the terminal.

According to an exemplary embodiment of the first aspect of the present invention, the one or more first fingerprints are obtained by one of the following steps i) and ii):

i) receiving one or more respective radio measurements, wherein the one or more respective radio measurements are gathered by one or more radio nodes comprised by an infrastructure of the venue, and generating the one or more first fingerprints based at least partially on the obtained one or more respective radio measurements and on one or more pieces of position information, wherein the one or more pieces of position information are indicative of the respective location of the one or more radio nodes from which the one or more respective radio measurements were obtained; or ii) receiving the one or more first fingerprints.

The radio measurement may for instance be indicative of a received signal strength of one or more signals sent by one or more radio nodes surrounding the one or more radio nodes.

The one or more respective radio measurements may for instance be one or more RSS-measurements, wherein at least one RSS-value is gathered (e.g. measured), wherein the at least one RSS-value is observable at the location of the respective radio node, which gathered (e.g. measured) the one or more respective radio measurements. The one or more respective radio measurements may for instance be gathered (e.g. measured) based on one or more signals of one or more radio nodes surrounding the respective radio node, which gathered (e.g. measured) the one or more respective radio measurements.

The one or more first fingerprints may for instance be generated based at least partially on the one or more respective radio measurements and on one or more pieces of position information, wherein the one or more pieces of position information are indicative of the location of the respective radio nodes, which gathered the one or more respective radio measurements.

In step i), the one or more first fingerprints are obtained by generating (e.g. combining) the one or more received radio measurements with the one or more obtained pieces of position information forming one or more first fingerprints. The one or more pieces of position information may for instance be obtained prior to generating the one or more first fingerprints. The one or more pieces of position information may for instance be stored in a memory of the first apparatus. The memory may for instance be comprised by the first apparatus, or be stored in a database, which is comprised by or at least accessible by the first apparatus. The one or more pieces of position information may for instance be calculated, e.g. by the first apparatus, by calculating a relative distance from a reference second apparatus, e.g. a radio node. The location of the reference second apparatus may for instance be known as a reference location. Such information, e.g. location of the reference second apparatus, may for instance be stored in a memory, or any other electronic device in the venue. Alternatively, the location of the reference second apparatus may for instance be provided by a user to the first apparatus, e.g. entered via a user interface (e.g. keyboard or the like).

In step ii), the one or more first fingerprints are obtained (e.g. received) directly from or via an entity that transmits the one or more first fingerprints to the first apparatus. Additionally or alternatively, in step ii), the one or more first fingerprints are obtained (e.g. received) from another first apparatus, e.g. comprised by the infrastructure of the venue.

According to an exemplary embodiment of the first aspect of the present invention, at least two first fingerprints are obtained, wherein at least one first fingerprint of the at least two first fingerprints is obtained by step i) and at least one other first fingerprint of the at least two first fingerprints is obtained by step ii). In case at least one first fingerprint of the one or more first fingerprints is obtained from another first apparatus, at least another first fingerprint of the one or more first fingerprints may for instance be received (e.g. directly) from at least one radio node (comprised by the infrastructure of the venue) as well.

In this way, the one or more first fingerprints obtained may for instance be obtained by a combination of i) receiving one or more respective radio measurements, wherein the one or more respective radio measurements are gathered by one or more radio nodes comprised by the infrastructure of the venue, and e.g. the first apparatus generates the one or more first fingerprints based at least partially on the obtained (e.g. received) one or more respective radio measurements and on one or more pieces of position information, wherein the one or more pieces of position information are indicative of the respective location of the one or more radio nodes from which the one or more respective radio measurements were obtained (e.g. received), and of ii) receiving one or more first fingerprints (which are already determined prior to the obtaining).

Said first fingerprint obtained by step ii) may for instance be received as an already completed (e.g. determined) first fingerprint. The determining of the first fingerprint may for instance be performed by a radio node prior to transmitting the first fingerprint, e.g. to the first apparatus.

According to an exemplary embodiment of the first aspect of the present invention, the method further comprises:

gathering one or more second fingerprints, wherein the one or more second fingerprints are gathered based at least partially on one or more signals sent by one or more radio nodes surrounding the first apparatus; wherein the radio map is generated based at least partially on the obtained one or more second fingerprints.

The one or more second fingerprints may for instance be gathered by determining the one or more second fingerprints, e.g. based at least partially on one or more respective radio measurements and on a piece of position information. The one or more respective radio measurements may for instance be performed (e.g. measured) by the first apparatus. The radio measurement may for instance be indicative of a received signal strength of one or more signals sent by one or more radio nodes surrounding the first apparatus.

Each respective fingerprint may for instance comprise at least one received signal strength value being associated with the piece of position information comprised by each respective fingerprint. Each respective fingerprint of the one or more first fingerprint and/or of the one or more second fingerprints comprises a piece of position information representing a horizontal position (e.g. a location). The piece of position information may for instance represent the location of the venue where the RSS value is gathered (e.g. measured). Each respective fingerprint of the one or more first fingerprints and/or of the one or more second fingerprints may for instance represent a sample radio measurement gathered (e.g. measured) by a first apparatus (e.g. an electronic device) according to the first aspect and/or by a second apparatus (e.g. a radio node) according to the second exemplary aspect, wherein the RSS value of all signals observable (e.g. receivable) and which are transmitted by one or more (surrounding) radio nodes is gathered (e.g. measured). Each of such a fingerprint may for instance be measured e.g. by one or more sensors (e.g. receivers, BLE and/or Wi-Fi receiver(s)) of the respective first apparatus (e.g. electronic device) and/or second apparatus (e.g. radio node).

Additionally, each respective fingerprint may for instance comprise one or more identifiers of radio nodes, which transmitted one or more signals are receivable at the horizontal position represented by the piece of position information. Based on a respective identifier of a radio node, the horizontal position of said radio node may for instance be determined. For instance, a database may comprise the horizontal position of a radio node corresponding to the identifier of the radio node. Further, the RSS value of each respective fingerprint may for instance be determined based at least partially on the piece of position information and the identifier of the respective radio node. Based on the identifier of the radio node, the horizontal position of said radio node may for instance be determined. Using for instance a channel model representing the propagation of the one or more signals transmitted by the radio node, the RSS value of the one or more signals received at the horizontal position of the radio node may for instance be determined. A more accurate RSS value may for instance be obtained in case the RSS value is e.g. measured. For determining the horizontal location, each respective radio node may for instance comprise or be connectable to one or more sensors for determining the radio nodes position. Alternatively, the radio nodes position may for instance be known, e.g. as an accessible information stored in a database.

Each respective fingerprint of the one or more second fingerprints may for instance be gathered (e.g. measured) by the first apparatus. Each respective first fingerprint may for instance be gathered by obtaining a piece of position information (e.g. determining a horizontal location) and by measuring signals transmitted by one or more radio nodes—also referred to as one or more respective radio measurements, which are receivable at the horizontal location the first apparatus is located within the venue.

The one or more first and/or second fingerprints may for instance be gathered by a plurality of radio nodes and/or electronic devices, wherein each of the said plurality of radio nodes and/or electronic devices is comprised by the infrastructure of the venue. Each of the plurality of radio nodes and/or electronic devices e.g. measures signals transmitted from one or more radio nodes (e.g. surrounding radio nodes), which one or more signals are receivable with one or more sensors (e.g. Bluetooth and/or Wi-Fi receiver(s)) comprised by each respective radio node and/or electronic device). Each respective fingerprint may for instance comprise one or more identifiers of the one or more radio nodes, which one or more signals are receivable, wherein each respective fingerprint may for instance comprise said identifiers of the one or more radio nodes as a list. Additionally, the list may for instance be associated with a RSS value.

In case more than one first apparatuses (e.g. electronic devices respectively central devices) are used for obtaining the one or more second fingerprints, the more than one first apparatuses are distributed such that having coverage of each respective radio node together. Not each of the more than one first apparatuses needs to have coverage of every radio node of the venue.

It should be noted that the step of obtaining the one or more first fingerprints and the step of gathering the one or more second fingerprints may take place in parallel. Alternatively, the one or more first fingerprints and the one or more second fingerprints are obtained consecutively.

According to an exemplary embodiment of the first aspect of the present invention, each respective first fingerprint of the one or more first fingerprints comprises at least one received signal strength value of one or more surrounding radio nodes of the radio node, which one or more surrounding radio nodes gathered the respective first fingerprint.

The one or more surrounding radio nodes may for instance be located within the vicinity of the radio node, which gathered the respective first fingerprint. For instance, the one or more surrounding radio nodes are within the vicinity of the radio node, which gathered the respective first fingerprint in case the transmitted one or more signals of the one or more radio nodes are receivable by the radio node, which gathered the respective first fingerprint.

In case the radio node, which gathered the respective first fingerprint, may for instance transmit one or more signals itself, for gathering (e.g. measuring) the respective fingerprint of the one or more first fingerprints, at least for the time the gathering takes, the respective radio node may for instance deactivate the transmission of its own one or more signals. Alternatively, the radio node which gathered the respective first fingerprint may for instance determine the respective first fingerprint by subtracting the one or more signals transmitted by itself from the gathered first fingerprint, in case e.g. the respective radio node has not e.g. deactivated the transmission of its own one or more signals.

In this way, each respective radio node comprised by the infrastructure of the venue may for instance gather one or more first fingerprints from the one or more radio nodes, which are comprised by the infrastructure of the venue as well. Since in general a plurality of radio nodes are comprised by the infrastructure of the venue to employ indoor positioning and/or floor detection, a relatively large amount of fingerprints (one or more first fingerprints) can be obtained very quickly by gathering the fingerprints by the one or more radio nodes comprised by the infrastructure of the venue. In contrast, the surveying approach, wherein the fingerprints required for performing indoor positioning and/or floor detection processes are gathered by an electronic device which may for instance be walked around the entire venue by a user for gathering the necessary fingerprints, takes significantly longer in order to obtain the relatively large amount of fingerprints. Further, the surveying approach is way less adaptive to changes e.g. in the physical infrastructure of the venue, e.g. removed or added walls, doors, or the like to name but a few non-limiting examples.

According to an exemplary embodiment of the first aspect of the present invention, each respective first fingerprint of the one or more first fingerprints comprises at least one received signal strength value of one or more surrounding radio nodes of the radio node, which gathered the respective first fingerprint.

Additionally, each respective second fingerprint of the one or more second fingerprints comprises at least one received signal strength value of one or more surrounding radio nodes of the first apparatus, which gathered the respective second fingerprint.

According to an exemplary embodiment of the first aspect of the present invention, the method further comprises:
  interpolating such parts of the generated radio map of the venue, with which no first and/or second fingerprints are associated;
  wherein the interpolated radio map is outputted.

Fingerprints may for instance not be gatherable for such parts of the radio map, because there may be no radio nodes or electronic devices comprised at said location by the infrastructure of the venue.

Such parts of the generated radio map, for which no fingerprints are obtained, may for instance be interpolated, e.g. by calculation in-between-values e.g. for observed RSS based on adjacent RSS values, which are explicitly gathered and obtained as one or more first fingerprints and/or as one or more second fingerprints.

According to an exemplary embodiment of all aspects of the present invention, each respective fingerprint obtained is interpolated to achieve a grid-like arrangement comprising a plurality of grid-points of distributed fingerprints across the radio map of the venue, and wherein the radio map is generated based at least partially on said interpolated grid of fingerprints.

The grid-points may for instance be substantially evenly distributed across the radio map, which radio map is to be generated. For instance, the grid-points associated with the radio map of the venue may for instance be distributed substantially evenly across the radio map of the venue in case each respective grid-point is spaced e.g. 0.5 to 5 meters, 1 to 4 meters, or 2 to 3 meters to the next adjacent grid-point (true to scale of the radio map), to name but a few non-limiting examples. Additionally, interpolation may for instance be performed to fill the grid. For instance, based on one or more values (e.g. RSS value) associated with a grid-point, grid-points having no value associated with them between two adjacent grid-points being associated with one or more values (e.g. RSS value) may for instance be determined (e.g. calculated) by the interpolation. Within the meaning of the present invention, the grid-points are substantially evenly distributed e.g. in case the distance is pre-defined or determined according to pre-defined rules, e.g. between two adjacent grid-points the distance varies between the range of e.g. 0.5 to 5 meters, 1 to 4 meters, or 2 to 3 meters (true to scale of the radio map).

In case the radio map has more than one RSS value associated with one grid-point of the grid-like arrangement, e.g. an average value, or a median value for the grid-point may be determined, or alternatively the most up-to-date RSS value available (e.g. in the radio map) may be the chosen RSS value for the grid-point.

In case the radio map is stored, e.g. at a database accessible by a server or a server cloud, or at least one of the one or more electronic devices, the stored radio map may for instance be updated by changing at least one value associated with a grid point. In case, something in the infrastructure of the venue changes, e.g. a wall or door is added, not the whole radio map has to be generated again.

According to an exemplary embodiment of the first aspect of the present invention, the radio map is outputted to another apparatus, wherein the other apparatus generates a further radio map based at least partially on the outputted radio map and at least one further radio map of the venue obtained by the other apparatus, e.g. earlier.

The radio map may for instance be outputted to a server or to a server cloud, or another entity that is different from one of the apparatuses performing and/or controlling the present invention.

For instance, the further radio map may be generated by merging the generated radio map with the at least one further radio map.

The at least one further radio map may for instance be obtained by receiving the at least one further radio map, e.g. from a server or from a server cloud, or from another apparatus that is different from the apparatus performing and/or controlling the method of all aspects of the present invention, e.g. another first apparatus of the venue in case the infrastructure of the venue comprises more than one first apparatuses. Further, the at least one further radio map may for instance be obtained by providing the at least one further radio map to the first apparatus performing and/or controlling the method of the first aspect of the present invention, or to an entity that transmits the at least one further radio map to the further apparatus generating the further radio map.

Alternatively, in case the further radio map is generated by the first apparatus, which generated the radio map, the radio map may for instance not be needed to be output. In this case, the further radio map may for instance be generated based at least partially on the generated radio map and at least one further radio map of the venue obtained by the first apparatus.

According to an exemplary embodiment of all aspects of the present invention, the radio map is outputted for usage in an indoor navigation process.

The radio map is outputted e.g. to a terminal, which may for instance have requested the provision of an indoor navigation process and/or floor detection process in the venue. The radio map is outputted e.g. to a server or a server cloud, or to one of the one or more electronic devices, which gathered at least one of the one or more second fingerprints. The radio map may for instance be outputted by transmitting the radio map e.g. based on wireless—(e.g. based on WLAN- or BLE-communication standard) or wirebound-based (e.g. based on LAN (Local Area Network communication standard) communication.

The radio map is outputted e.g. to one or more terminals. The one or more terminals may for instance gather a radio measurement, wherein the radio map and the radio measurement are used for performing a position estimation.

According to an exemplary embodiment of all aspects of the present invention, more than one radio maps are outputted to at least one terminal for usage in an indoor navigation process.

In case the more than one radio maps are outputted to more than one terminals, each terminal of the more than one terminals may for instance receive more than one radio map. Thus, a terminal may for instance receive two radio maps. The more than one radio map may for instance be a partial radio map. The more than one radio map may for instance be provided by more than one (e.g. separate) first apparatuses (e.g. more than one central device). For instance, in case a terminal receives two (partial) radio maps, one of these (partial) radio maps may be received from a first apparatus, and the other (partial) radio map of the (partial) radio maps may be received from another first apparatus. The at least one terminal, which may be provided with the more than one radio maps, may for instance generate a further (e.g. complete) radio map based on the more than one radio maps. Such a generated further (e.g. complete) radio map may for instance be used by the at least one terminal to perform position estimation and/or floor detection in a venue. It will be understood that this generate further (e.g. complete) radio map may be outputted as well, e.g. to a device (e.g. central device, radio node, server, terminal, to name but a few non-limiting examples).

In this way, the one or more terminals may perform indoor positioning respectively navigation and/or floor detection in the venue.

Additionally, the further radio map generated, e.g. by the further apparatus, or by the first apparatus, may for instance be outputted as well for usage in an indoor navigation process and/or floor detection process, e.g. to a terminal.

In case the radio map is outputted to e.g. a server or a server cloud, at least a part of the outputted radio map may for instance be used in a learning process, e.g. for sequentially achieving a complete radio map of the venue and/or for enhancing (e.g. updating) the radio map of the venue.

According to an exemplary embodiment of the first aspect of the present invention, the one or more radio nodes comprised by the infrastructure of the venue are distributed within the venue in a grid-like arrangement.

The one or more radio nodes comprised by the infrastructure of the venue may for instance be substantially evenly distributed within the venue in a grid-like arrangement. For instance, the one or more radio nodes comprised by the infrastructure of the venue may for instance be evenly distributed in a substantially quadratic grid comprising grid-points, which are spaced evenly from each other, e.g. having the same distance between two adjacent (e.g. neighboring) grid-points. Two radio nodes are adjacent to each other, if they are distributed to be neighboring grid-points. In the venue, these same two radio nodes may for instance be physically separated e.g. by a wall, door, open space or the like to name but a few non-limiting examples.

The grid may for instance be a two-dimensional grid, which may be overlayed on a representation of a map of the venue. Additionally, the grid may for instance be a three-dimensional grid, e.g. wherein the third dimension may additionally comprise one or more floor levels of the venue.

For instance, the radio nodes comprised by the infrastructure of the venue may for instance be distributed substantially evenly within the venue in case each respective radio node is spaced about 10 meters to the next adjacent radio node. The distance may for instance vary, e.g. if there is no location to place a further radio node (e.g. being adjacent to a located radio node) in the venue. Within the meaning of the present invention, the one or more radio nodes comprised by the infrastructure of the venue are substantially evenly distributed in case the distance is pre-defined or determined according to pre-defined rules, e.g. the distance between two adjacent radio nodes varies between the range of e.g. 7 to 12, 8 to 11, or 9 to 10 meters. The distance between two adjacent radio nodes may for instance be determined based on transmitted power of radio nodes. For instance, the one or more radio nodes comprised by the infrastructure of the venue are substantially evenly distributed in case the distance between two adjacent radio nodes varies between the range of the transmitted power of radio nodes. For instance, these distances are ranges for a radio node transmitting 0 dB. Further radio nodes are placed at pre-defined distances from surrounding (e.g. neighboring) radio nodes. The pre-defined distance may for instance be calculated based on transmitted power of the radio nodes. The pre-defined distance may for instance be determined (e.g. calculated) based on transmitted (signal) power of the radio nodes. For instance, 10 meters is suitable for 0 dBm transmitted (signal) power.

According to an exemplary embodiment of the first aspect of the present invention, the radio map is generated by associating each respective fingerprint (e.g. first and/or second fingerprint) with a grid-like arrangement of the radio map, wherein the grid-like arrangement comprises a plurality of grid-points distributed across a map of the venue, and wherein each respective fingerprint is associated with the grid-point corresponding to the location of the piece of position information comprised by each respective fingerprint.

According to an exemplary embodiment of the first aspect of the present invention, a position of a radio node of the venue is determined based at least partially on the generated radio map.

According to an exemplary embodiment of the first aspect of the present invention, the one or more pieces of position information are obtained by calculating a relative distance from at least one reference point, wherein the at least one reference point is received.

The reference point may for instance be received from a server or from a user. Alternative or additionally, more than one reference point may for instance be used for the calculation enabling the possibility to calculate at least one distance in both dimensions of a horizontal plane.

According to an exemplary embodiment of the first aspect of the present invention, the first apparatus is a stationary device.

The first apparatus may for instance be a radio node, e.g. a stationary radio node comprised by the infrastructure of the venue.

The gathering of the one or more respective radio measurements, e.g. gathered by the second apparatus, may for instance be performed (e.g. measured) by the second apparatus. The radio measurement may for instance be indicative of a received signal strength of one or more signals sent by one or more radio nodes surrounding the second apparatus.

According to an exemplary embodiment of the second aspect of the present invention, the method further comprises:
  obtaining a piece of position information, wherein the piece of position information is indicative of the location of the second apparatus in the venue; and wherein the obtained piece of position information is broadcasted together with each respective radio measurement of the one or more respective radio measurements forming a fingerprint.

The obtained piece of position information may for instance be stored in a memory, e.g. a database. The memory may for instance be comprised by the second apparatus. In case the piece of position information is stored in a database, the piece of position information is accessible, e.g. the piece of position information may for instance be read by or be transmitted to the second apparatus.

Additionally or alternatively, the memory may for instance be accessible by the second apparatus. In this way, a stored piece of position information may for instance be obtained by the second apparatus. Further, the piece of position information may for instance be obtained by determining the location of the second apparatus in the venue, such as for instance a Global Navigation Satellite System (GNSS) receiver, e.g. in the form of a Global Positioning System (GPS) receiver, in case such a receiver is usable in the venue.

Additionally or alternatively, the piece of position information may for instance be determined (e.g. estimated) from one or more reference points respectively positions respectively locations in the venue, wherein such one or more reference points may for instance be accessible by the at least one first apparatus (e.g. at least one central device). In this way, a relative distance between one or more radio nodes in the venue may for instance be determined. A different radio (e.g. transceiver) may for instance be used for the determining. Such a different radio e.g. as one or more means may for instance be comprised by the at least one first apparatus (e.g. central device) and/or by the at least one second apparatus (e.g. radio node) of the venue. The different radio may for instance be according to UWB (Ultra Wide Band) communication standard, which may for instance provide very accurate relative distance estimation between radio nodes.

According to an exemplary embodiment of the second aspect of the present invention, each respective radio measurement of the one or more respective radio measurements comprises a respective received signal strength value of the one or more respective signals received, e.g. by the second apparatus.

The gathered one or more respective radio measurements may for instance be one or more RSS measurements, e.g. in the form of at least one RSS-value. The piece of position information may for instance be associated with the at least one RSS value. The one or more respective radio measurements form together with the piece of position information a fingerprint. Such a fingerprint may for instance be broadcasted. The broadcasted fingerprint may for instance be obtained as a first fingerprint by the first apparatus.

According to an exemplary embodiment of the second aspect of the present invention, at least one respective radio node of the one or more respective radio nodes surrounding the second apparatus is a radio node not capable of broadcasting the one or more respective radio measurements.

The method according to the second exemplary aspect of the present invention may for instance be performed and/or controlled by at least one of the one or more electronic devices.

The following exemplary embodiments according to all aspects of the present invention shall also considered to be disclosed:

The first apparatus may for instance equal a terminal (e.g. smartphone, tablet, navigation device to name but a few non-limiting examples), but by being comprised by the infrastructure of the venue, the first apparatus may for instance be permanently installed in the venue. In this way, the first apparatus comprised by the infrastructure of the venue is a stationary device.

The indoor positioning request may for instance be obtained from a terminal (e.g. smartphone, tablet, portable navigation device, an IoT (Internet of Things) device to name but a few non-limiting examples). The indoor positioning request may for instance be provided from a server of a service provider. The indoor positioning request may for instance comprise a request for performing and/or controlling a location estimation of a location within the venue, e.g. of the terminal from which the indoor positioning request originates. Further, the indoor positioning request may for instance comprise a gathered (e.g. measured) radio measurement of the terminal, wherein the gathered fingerprint may for instance be equal to the one or more first fingerprints and/or the one or more second fingerprints. Additionally or alternatively, the indoor positioning request may for instance comprise or be a request for performing and/or controlling a floor detection within the venue, e.g. of the terminal from which the indoor positioning request originates.

Upon reception of such an indoor positioning request, the method of all aspects of the present invention may for instance be performed and/or controlled. Thus, for every indoor positioning request obtained (e.g. received), one or more first fingerprints and one or more second fingerprints are obtained, and based on which one or more first fingerprints and on which one or more second fingerprints a radio map is generated. Additionally or alternatively, an already generated radio map may for instance be associated with a validity period (e.g. time to live), e.g. according to the venue (e.g. building) behavior. For instance, in an office building generated radio map may for instance be valid for a couple of months, but in a shopping mall a generated radio map may be valid for only a week. In case the validity period associated with a generated radio map has expired, a new radio map may for instance be generated, e.g. according to the method of all aspects of the present invention.

In this way, real time indoor positioning and/or floor detection can be achieved. For instance, a user of a terminal, from which the indoor positioning request stems, gets location estimation and/or floor detection based on real-time achieved fingerprints and therefore the most actual radio map is used for the location estimation and/or the floor detection. Processing power requirements for the real-time performance of the method according to the present invention may be significant, but due to increasing processing power capabilities of modern devices more accurate indoor positioning can be achieved. Anyhow, since the performance of the method according to the present invention is regularly performed in a cloud (e.g. server cloud), processing power requirements may not be of further interest.

According to an exemplary embodiment of all aspects of the present invention, each respective first and/or second fingerprint comprises the following parameters i) to iii):

i) position information being indicative of the location within the venue at which the respective fingerprint is obtained;
ii) a list information comprising an identifier information of each respective radio node, which is considered in the respective fingerprint; and
iii) a received signal strength value associated with each respective radio node, which is considered in the respective fingerprint.

The formulation "which is considered in the respective fingerprint" as used herein may for instance be understood as an equivalent to the formulation "which signal is receivable at the location within the venue at which the fingerprint is obtained".

Further, each respective first and each respective second fingerprint may for instance comprise one or more pieces of additional information (e.g. advertisement information of radio nodes), which one or more pieces of additional information may for instance be indicative of information to enhance the identification of one or more surrounding radio nodes uniquely. Further, each respective first fingerprint and each respective second fingerprint may for instance comprise a time and/or date at which the respective fingerprint is obtained.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION

The following description serves to deepen the understanding of the present invention and shall be understood to complement and be read together with the description as provided in the above summary section of this specification.

Figure 1:
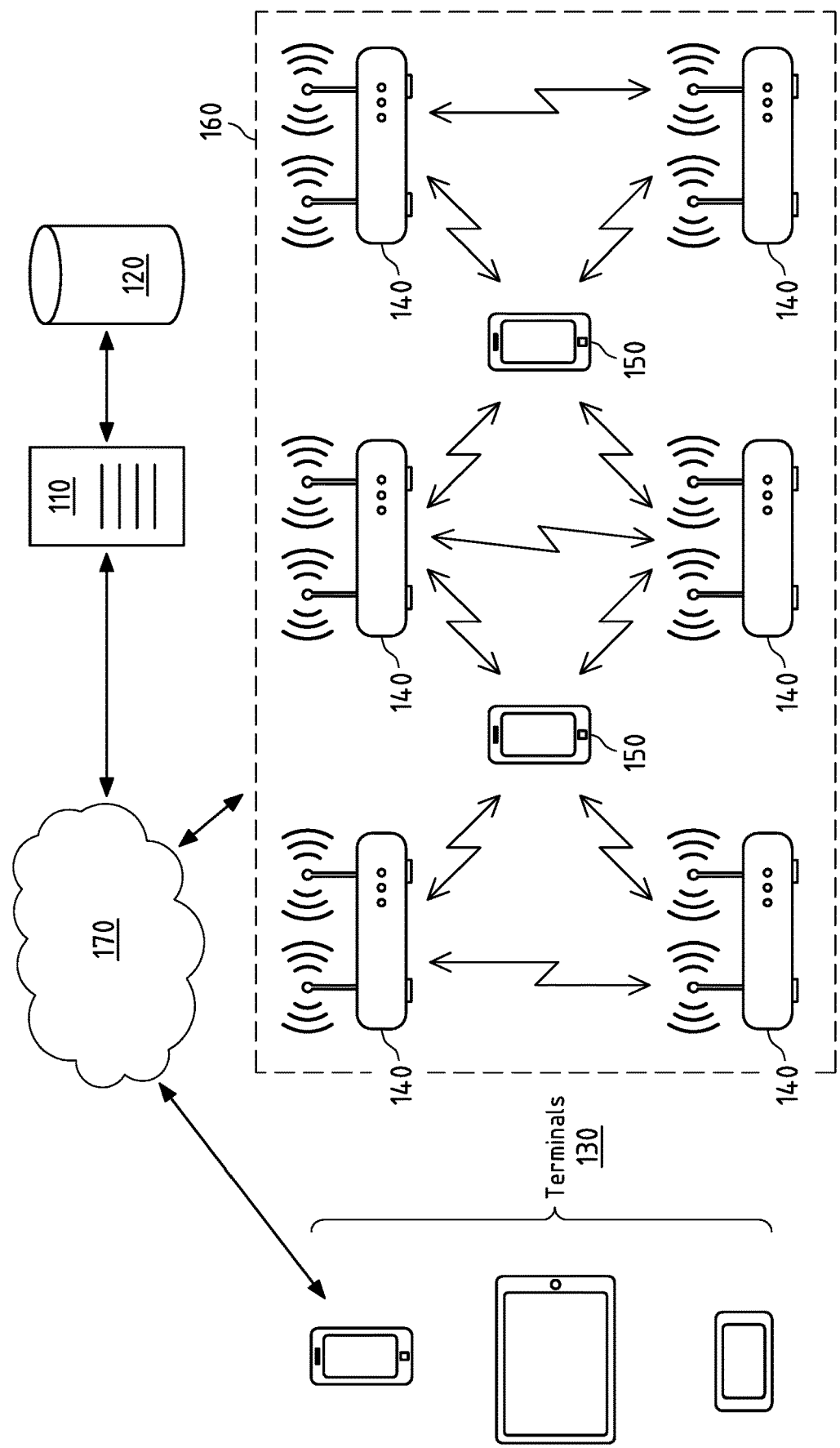
FIG. 1 a schematic block diagram of an example embodiment of an example system according to the present invention.

FIG. 1 shows a schematic block diagram of an example embodiment of a system 100 according to the third exemplary aspect of the present invention comprising an example first apparatus according to the first exemplary aspect of the present invention, and an example second apparatus according to the second exemplary aspect of the present invention.

System 100 comprises a server 110, which may alternatively embodied as a server cloud (e.g. a plurality of servers connected e.g. via the Internet and providing services at least partially jointly), a database 120, and a terminal 130, of which three different realizations are exemplarily shown: a mobile phone (e.g. a smartphone), a tablet, and a portable navigation device. Further, the terminal 130 may for instance be an IoT (Internet of Things) device, which may for instance be e.g. reasonably priced and comprise simple hardware. Further, system 100 comprises a communication network 170, e.g. the Internet or other wireless-based communication network, such as a Wireless Local Area Network (WLAN), or a Bluetooth based communication network. The system 100 comprises an infrastructure 160 of a venue. The infrastructure 160 comprises one or more radio nodes 140, of which six are shown at hand, and one or more central devices 150, of which two are shown at hand. The central devices 150 may for instance be configured to perform and/or control an example first method according to the first aspect of the present invention. The radio nodes 140 may for instance be configured to perform and/or control an example second method according to the second aspect of the present invention. The radio nodes 140 may be also referred to as 'mirror beacons'. A mirror beacon may for instance be embedded in a standard radio node. A mirror beacon may for instance gather one or more respective radio measurements of non-mirror beacons in the venue. For instance, each respective radio node may for instance use BLE user defined advertisement to broadcast the gathered fingerprint. In some instance, e.g. a firmware of the radio nodes needs to support this functionality. All hardware and protocols used by the radio node may for instance be according to the standard (e.g. WLAN- and/or BLE-standard). The method according to the first and/or second exemplary aspects may for instance be added as one extra functionality of standard radio nodes (e.g. beacons). For instance, in a BLE beacon, mirror beacon functionality can be interleaved with other BLE standard.

According to exemplary embodiments of the present invention, central devices 150 and radio nodes 140 may for instance be setup to be one type of beacon, e.g. both center devices 150 and the plurality of radio nodes 140 are of the same type. The radio nodes 140 themselves may for instance select a center device 150 which performs an obtaining of one or more first fingerprints and optionally gathering one or more second fingerprints. This may for instance be done by setting up a Personal Area Network (PAN) and nominating one device to behave as a center device, e.g. a 'master' center device. The coverage may for instance be extended by meshing two or more PAN networks. In this way, only one center device of more than one center devices, e.g. center devices 150, will make connection to a back-end, e.g. server 110.

According to exemplary embodiments of the present invention, central devices 150 may for instance gather (e.g. measure) one or more second fingerprints inside the venue from the one or more radio nodes 140 of the infrastructure 160. These second fingerprints may for instance be stored in a memory, e.g. the database 120. The database 120 may for instance be accessible by each of the central devices 150. After gathering the one or more second fingerprints, for storing them, the second fingerprints are e.g. received by server 110 from the central devices 150. The radio nodes 140 may for instance gather (e.g. measure) one or more first fingerprints inside the venue from the infrastructure 160 comprising the radio nodes 140. These first fingerprints are obtained (e.g. received) by at least one of the central devices, and may for instance be stored in the database 120 as well.

Further, one of the central devices 150 may for instance transmit one or more obtained first fingerprints to one of the other central device 150, wherein the other central device may for instance be selected to be the 'master' central device 150, which may for instance be responsible for generating the radio map.

Communication between terminal 130, server 110, the radio nodes 140 and the central devices 150 may for instance take place at least partially in a wireless fashion, e.g. based on cellular radio communication or on WLAN-based, or on Bluetooth based communication, to name but a few non-limiting examples. For instance, communication network 170 may for instance provide such a communication. Alternatively or additionally, communication may for instance take place directly between the entities (e.g. terminal 130, server 110, the radio nodes 140 and the central devices 150). For instance, the entities may all use communication according to Wi-Fi- and/or Bluetooth communication standard. All the communication (e.g. fingerprint obtaining/gathering, radio map distribution, to name but a few non-limiting examples) between different entities of the system 100 (e.g. terminal 130, server 110, the radio nodes 140 and the central devices 150) may for instance be done using broadcasts. For instance, each entity (e.g. terminal 130, server 110, the radio nodes 140 and the central devices 150) of the system 100 can receive all the communication. Mobility of the terminal 130 can be guaranteed by employing wireless-based communication.

The central devices 150 may for instance be terminals (e.g. a smartphone), tablets, or portable navigation devices. The central device may for instance comprise one or more means (e.g. a sensor, a transceiver, a receiver, a sender, or a combination thereof (in particular a receiver and a sender), to name but a few non-limiting examples) for a communication with the radio nodes 140, and with the terminal 130, and optionally with the server 110, e.g. via the communication network 170. The communication between the central devices 150 and the radio nodes may for instance be based on a different communication technology than the communication between the central devices 150 and the terminal 130 or between the central devices 150 and the server 110. In the aforementioned cases, the central devices may for instance comprise at least two means for communication (e.g. two sensors, two transceivers, two receivers, two senders, or a combination thereof (in particular two receiver and two sender), to name but a few non-limiting examples).

Figure 2:
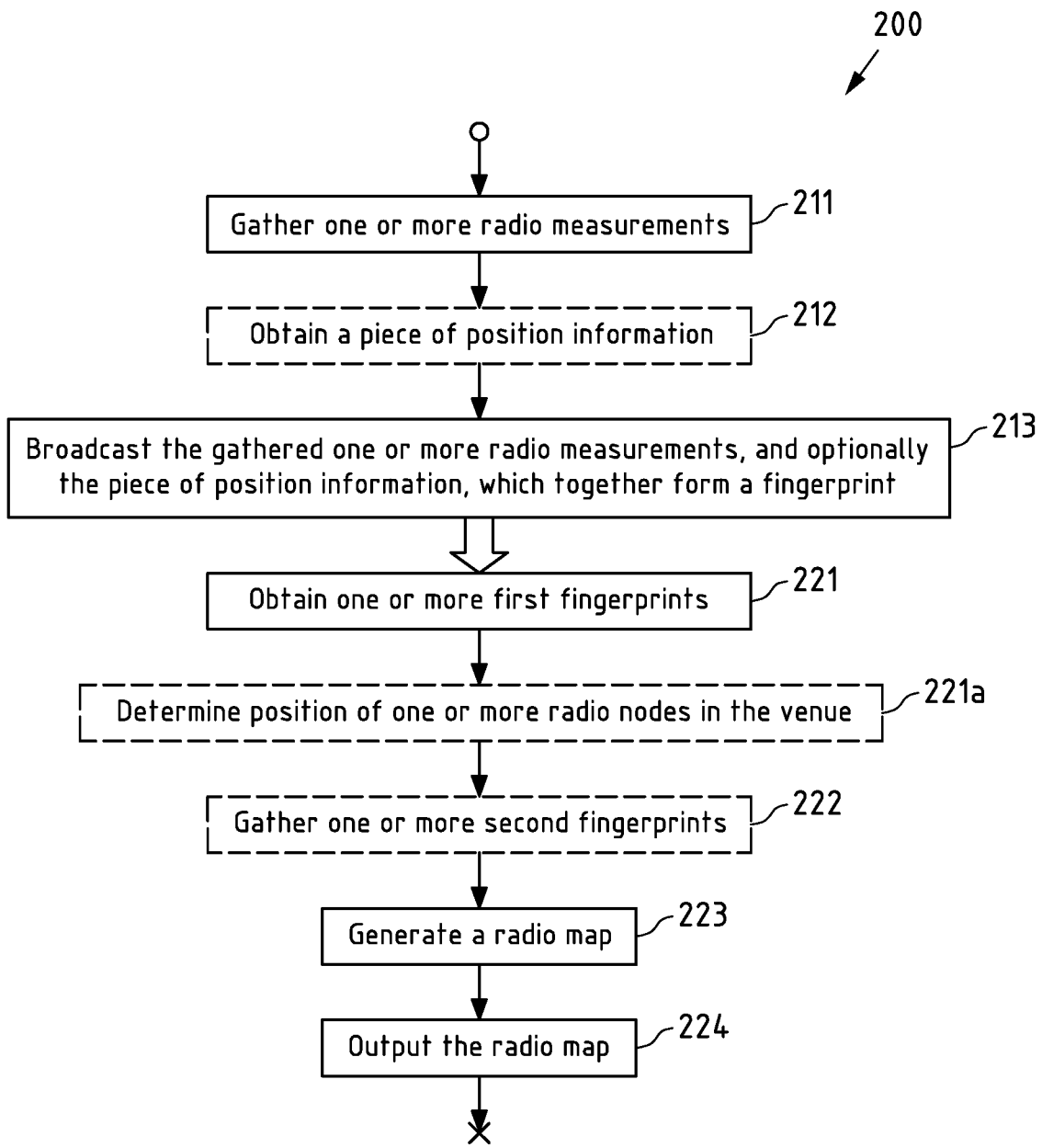
FIG. 2 a flow chart illustrating an example operation of an example system according to the present invention.

FIG. 2 shows a flow chart illustrating an example operation of an example system according to the present invention.

Flow chart 200 may for instance be performed by an example system according to the third exemplary aspect of the present invention. The steps 211 to 213 may for instance be performed by each of the radio nodes 140 of FIG. 1. The step 221 to 224 may for instance be performed by at least one of the central devices 150 of FIG. 1.

In step 211, one or more respective radio measurements are gathered (e.g. measured), e.g. by each of the radio nodes 140 of FIG. 1.

In optional step 212, a piece of position information is obtained, e.g. by each of the radio nodes 140 of FIG. 1. The piece of position information is indicative of the position of each respective radio node (e.g. radio nodes 140 of FIG. 1) in a venue. The piece of position information may for instance be obtained by requesting the piece of position information out of a memory, e.g. comprised by each respective radio node (e.g. radio nodes 140 of FIG. 1).

In step 213, the gathered one or more respective radio measurements and optionally the piece of position information are broadcasted. These broadcasted advertisements may for instance be obtained by one or more central devices (e.g. central devices 150 of FIG. 1). The one or more respective radio measurements and the piece of position information form together a fingerprint.

The broad arrow between step 213 and step 221 shall be considered to indicate that one or more first fingerprints, e.g. a plurality of first fingerprints each of said plurality of fingerprints comprising one or more respective radio measurements and a piece of position information forming a fingerprint, may be broadcasted by one or more radio nodes.

In step 221, one or more first fingerprints, e.g. a plurality of first fingerprints are obtained, e.g. by at least one of the central devices 150 of FIG. 1. The at least one of the central devices 150 may for instance be selected to be the master central device, which may for instance be responsible for generating the radio map, and outputting the radio map, e.g. to a terminal (e.g. terminal 130 of FIG. 1), which may for instance request the provision of the radio map for performing indoor positioning respectively navigation and/or floor detection in a venue.

The one or more first fingerprints are obtained e.g. by receiving the one or more first fingerprints from one or more radio nodes, e.g. radio nodes 140 of FIG. 1. The one or more first fingerprints may for instance be obtained from another entity (not shown in FIG. 1) that is different from the one or more radio nodes (e.g. radio nodes 140 of FIG. 1) and that transmits the one or more first fingerprints to the master central device 150 of FIG. 1. Alternatively, the one or more first fingerprints are obtained of a memory (e.g. database 120 of FIG. 1), wherein the one or more first fingerprints are stored in the memory. Prior to obtaining the one or more first fingerprints out of the memory, the one or more fingerprints are gathered (e.g. measured) by the one or more radio nodes (e.g. radio nodes 140 of FIG. 1) and stored in the memory.

In optional step 221*a*, the (respective) position(s) of one or more radio nodes (e.g. radio nodes 140 of FIG. 1) is determined, e.g. based on one or more reference points (e.g. known or accessible by at least one of the central devices (e.g. central devices 150 of FIG. 1). For instance, at least one central device (e.g. at least one of the central devices 150 of FIG. 1) knows its location respectively position in the venue. The position of one or more radio nodes in the venue may then for instance be determined based on a relative position estimate (e.g. via UWB communication connection).

In optional step 222, one or more second fingerprints, e.g. a plurality of second fingerprints are gathered, e.g. by the master central device 150 of FIG. 1. The one or more second fingerprints are gathered, e.g. by measuring the one or more second fingerprints by at least one of the central devices, e.g. central devices 150 of FIG. 1. In case more than one central device 150 is comprised by the infrastructure (e.g. infrastructure 150 of FIG. 1) of the venue, the gathered one or more second fingerprints may for instance be transmitted from each of the central devices 150 to the master central device.

Further, the one or more second fingerprints may for instance be obtained from another entity (not shown in FIG. 1) that is different from the one or more central devices (e.g. central devise 150 of FIG. 1) and that transmits the one or more second fingerprints to the master central device. Alternatively, the one or more second fingerprints may for instance be obtained of a memory (e.g. database 120 of FIG. 1), wherein the one or more second fingerprints are stored in the memory. Prior to obtaining the one or more second fingerprints, the one or more second fingerprints are gathered (e.g. measured) by the one or more central devices (e.g. central devices 150 of FIG. 1) and stored in the memory.

In step 223, a radio map is generated. The radio map is generated based at least partially on the obtained one or more first fingerprints (see step 221) and on the obtained one or more second fingerprints (see step 222). The radio map is generated, e.g. by at least one of the central devices 150 of FIG. 1, e.g. the master central device. Then, the generated radio map may for instance be stored in a memory, e.g. database 120 of FIG. 1 accessible by the apparatus performing and/or controlling the example method of the present invention (e.g. central devices 150 of FIG. 1), and/or in a memory comprised by the at least one of the central devices 150 of FIG. 1. The server (e.g. server 110 of FIG. 1) may for instance generate a further radio map based at least partially on the generated radio map of the central device (e.g. the master central device 150 of FIG. 1) and other obtained radio maps.

In step 224, the generated radio map is output. The generated radio map is output, e.g. to terminal 130 of FIG. 1. The generated radio map is output, e.g. by transmitting the generated radio map to the terminal (e.g. terminal 130 of FIG. 1), e.g. from one of the central devices 150, in particular from the master central device, or from the central device in which coverage area the terminal is positioned (e.g. one of the central devices 150 of FIG. 1. Optionally, prior to outputting the generated radio map, the generated radio map may for instance be obtained of a memory (e.g. database 120 of FIG. 1), in which the generated radio is stored in the memory after the radio map is generated.

Based on the generated radio map, indoor positioning and/or floor detection may for instance be performed, e.g. by a comparison of a gathered fingerprint at the location in the venue to be determined (e.g. estimated) and the fingerprints comprised by the radio map.

Figure 3:
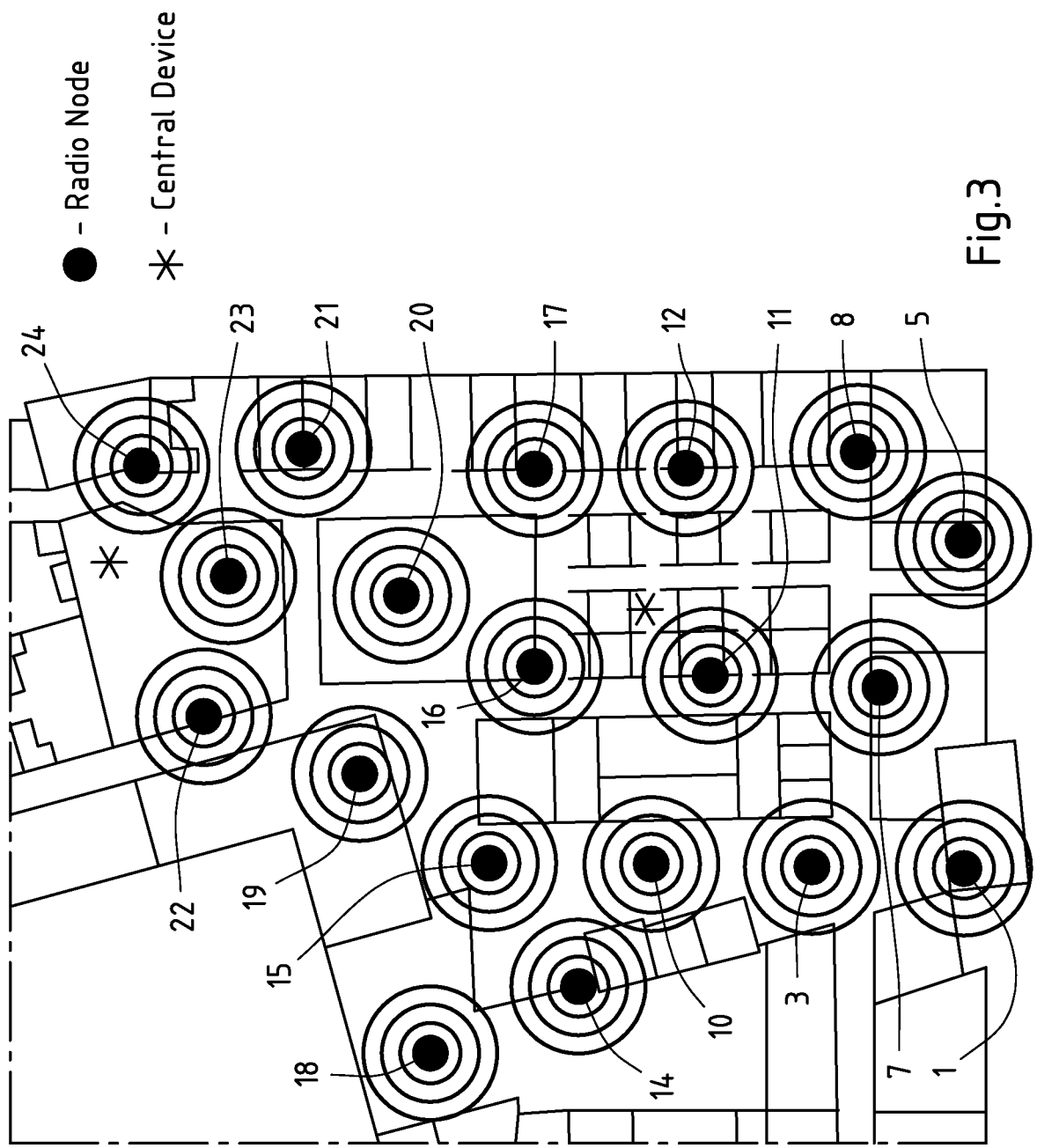
FIG. 3 a map of a venue comprising an infrastructure which is used in an exemplary embodiment of a method according to the present invention.

FIG. 3 shows a map of a venue comprising an infrastructure which is used in an exemplary embodiment of a method accord to the present invention.

The infrastructure of the venue comprises at hand 24 radio nodes (e.g. BLE beacons, each marked in FIG. 3 by the dot indication) and two central devices (each marked in FIG. 3 by the star indication). The location of each radio node in the venue can be seen. The radio nodes are each separated from each other about 10 meters apart and are comprised by the infrastructure of the venue in a grid-like arrangement. The number each dot of FIG. 3 is marked with, represents an Identifier (ID) of the respective radio node.

The central devices at hand obtain all advertisements of surrounding radio nodes, e.g. one or more first fingerprints and one or more second fingerprints. The one or more first fingerprints and the one or more second fingerprints are each broadcasted by each respective radio node. Each respective fingerprint of the one or more first and second fingerprints may for instance comprise e.g. a list of all surrounding radio nodes (e.g. BLE beacons), a RSS value received at the location of the radio node, and optionally the locations of all surrounding radio nodes. The obtaining of the broadcast of one or more first fingerprints and of the one or more second fingerprints from the radio nodes of surrounding radio nodes may for instance enable a central device to generate a radio map of the venue. The radio map is for instance generated by interpolating the fingerprints of in-between-values, for which locations no fingerprints are obtained.

Figure 4:
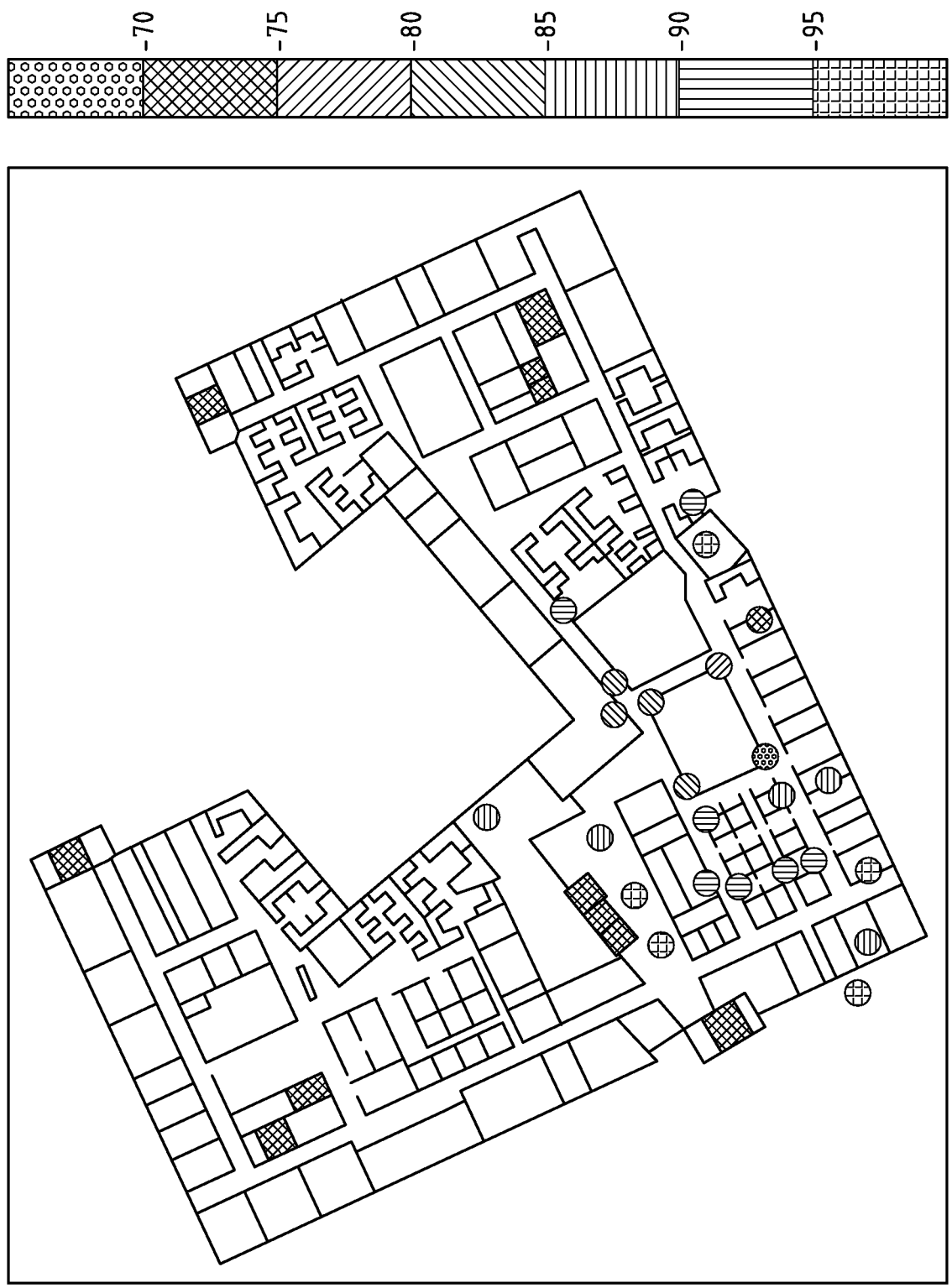
FIG. 4 a map of a venue, wherein collected fingerprints associated with positions in the venue are visualized, as used in an example method according to the present invention.

FIG. 4 shows a map of a venue, wherein collected fingerprints associated with positions in the venue are visualized, as used in of an example method according to the present invention.

FIG. 4 shows an example collection of advertisements (e.g. e.g. one or more first fingerprints and one or more second fingerprints) of radio nodes. In particular, FIG. 4 shows sample fingerprints of the radio node with the ID "17" of FIG. 3 gathered by surrounding radio nodes.

The different hatchings filling the dots (representing samples) of FIG. 4 each indicate the observed RSS-value at the location. Based at least partially on this information, a radio map can be generated, e.g. by a central device.

Figure 5:
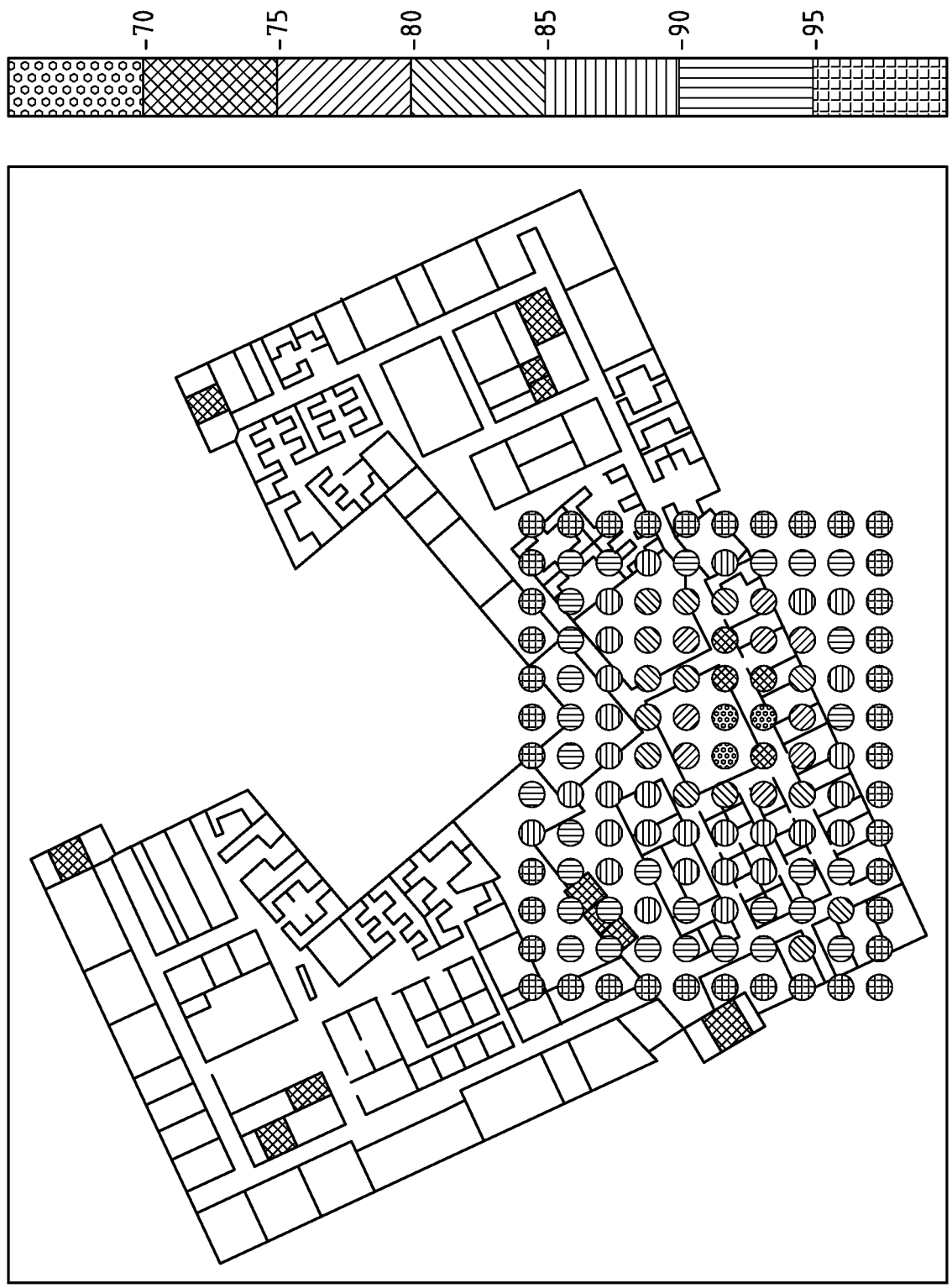
FIG. 5 a radio map of the venue corresponding to the radio map of FIG. 4 according to the present invention, which is additionally interpolated.

FIG. 5 shows a radio map of the venue corresponding to the radio map of FIG. 4 according to the present invention, which is additionally interpolated. Further exemplary radio maps may for instance be generated using one or more (obtained) fingerprints in different ways. For instance, a different kind of radio map may be a compressed radio map, parametrical models, to name but a few non-limiting examples.

The radio map shown in FIG. 5 is generated based at least partially on determined one or more third fingerprints (see step 203 of FIG. 2) by interpolating obtained one or more first fingerprints and obtained one or more second fingerprints.

Figure 6:
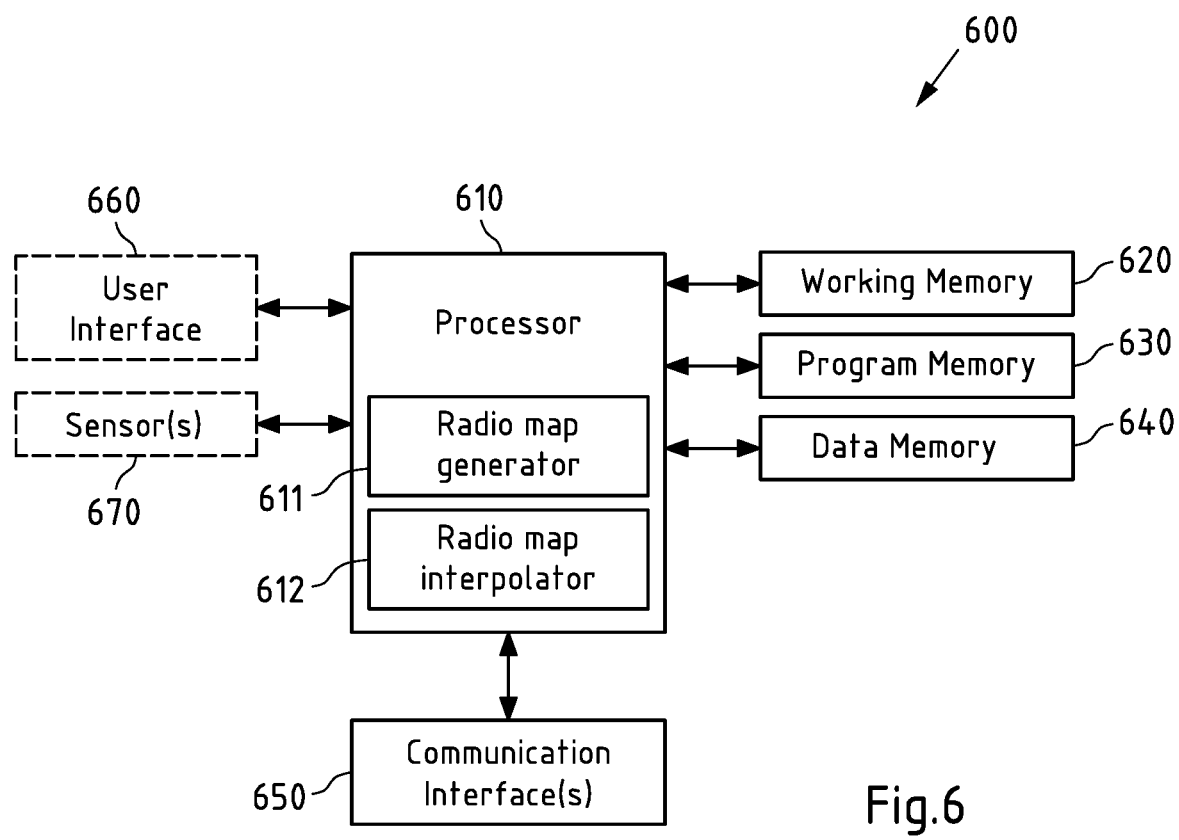
FIG. 6 a schematic block diagram of an example embodiment of a first apparatus according to the present invention.

FIG. 6 is a schematic block diagram of an apparatus 600 according to an exemplary aspect of the present invention, which may for instance represent one of the central devices 150 of FIG. 1.

Apparatus 600 comprises a processor 610, working memory 620, program memory 660, data memory 640, communication interface(s) 650, an optional user interface 660 and optional one or more sensor(s) 670.

Apparatus 600 may for instance be configured to perform and/or control or comprise respective means (at least one of 610 to 670) for performing and/or controlling the method according to the first aspect. Apparatus 600 may as well constitute an apparatus comprising at least one processor (610) and at least one memory (620) including computer program code, the at least one memory and the computer program code configured to, with the at least one processor, cause an apparatus, e.g. apparatus 600 at least to perform and/or control the method according to first exemplary aspect of the invention.

Processor 610 may for instance comprise a radio map generator 611 as a functional and/or structural unit. Radio map generator 611 may for instance be configured to generate a radio map (see step 223 of FIG. 2). Processor 610 may for instance comprise a radio map interpolator 612 as a function and/or structural unit. Radio map interpolator 612 may for instance be configured to interpolate a generated radio map. Processor 610 may for instance further control the memories 620 to 640, the communication interface(s) 650, the optional user interface 660 and the optional sensor(s) 670.

Processor 610 may for instance execute computer program code stored in program memory 660, which may for instance represent a computer readable storage medium comprising program code that, when executed by processor 610, causes the processor 610 to perform the method according to the first aspect.

Processor 610 (and also any other processor mentioned in this specification) may be a processor of any suitable type. Processor 610 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 610 may for instance be an application processor that runs an operating system.

Program memory 660 may also be included into processor 610. This memory may for instance be fixedly connected to processor 610, or be at least partially removable from processor 610, for instance in the form of a memory card or stick. Program memory 660 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 660 may also comprise an operating system for processor 610. Program memory 660 may also comprise a firmware for apparatus 600.

Apparatus 600 comprises a working memory 620, for instance in the form of a volatile memory. It may for instance be a Random Access Memory (RAM) or Dynamic RAM (DRAM), to give but a few non-limiting examples. It may for instance be used by processor 610 when executing an operating system and/or computer program.

Data memory 640 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store one or more radio maps, e.g. generated radio maps, interpolated radio maps, or further radio maps, which are obtained (e.g. received, or being provided) prior to storing them in the data memory 640. At least one of the stored radio maps may for instance be used for generating a further radio map, which further radio is generated based at least partially on one or more obtained first and/or second fingerprints and the at least one stored radio map. Data memory 640 may for instance store one or more pieces of position information.

Communication interface(s) 650 enable apparatus 600 to communicate with other entities, e.g. with server 110 of FIG. 1, or with radio node 140 of FIG. 1, and/or with terminal 130 of FIG. 1. The communication interface(s) 650 may for instance comprise a wireless interface, e.g. a cellular radio communication interface and/or a WLAN interface and/or a BLE interface and/or a UWB (Ultra Wide Band) interface (e.g. receiver) to estimate relative positions from references radio nodes) and/or wire-bound interface, e.g. an IP-based interface, for instance to communicate with entities via the Internet. Communication interface(s) may enable apparatus 600 to communicate with other entities, for instance with server 110 of FIG. 1, with radio node 140 of FIG. 1, and/or with terminal 130 of FIG. 1, dependent upon if apparatus 600 represents server 110 of FIG. 1, or central device 150 of FIG. 1.

User interface 660 is optional and may comprise a display for displaying information to a user and/or an input device (e.g. a keyboard, keypad, touchpad, mouse, etc.) for receiving information from a user.

Sensor(s) 670 are optional may for instance comprise a one or more sensors, e.g. to gather additional information, e.g. pressure information usable for floor detection to name but one non-limiting example.

Some or all of the components of the apparatus 600 may for instance be connected via a bus. Some or all of the components of the apparatus 600 may for instance be combined into one or more modules.

Figure 7:
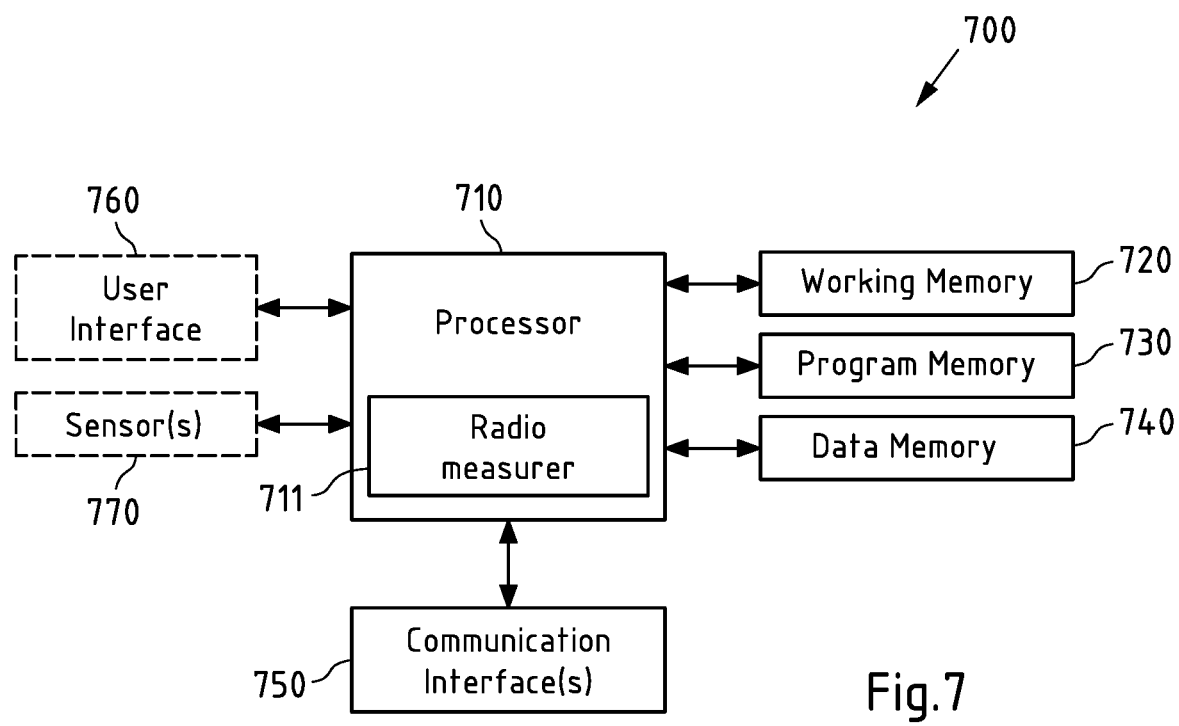
FIG. 7 a schematic block diagram of an example embodiment of a second apparatus according to the present invention.

FIG. 7 is a schematic block diagram of an apparatus 700 according to an exemplary aspect of the present invention, which may for instance represent one of the radio nodes 140 of FIG. 1.

Apparatus 700 comprises a processor 710, working memory 720, program memory 760, data memory 740, communication interface(s) 750, an optional user interface 760 and optional one or more sensor(s) 770.

Apparatus 700 may for instance be configured to perform and/or control or comprise respective means (at least one of 710 to 770) for performing and/or controlling the method according to the second aspect. Apparatus 700 may as well constitute an apparatus comprising at least one processor (710) and at least one memory (720) including computer program code, the at least one memory and the computer program code configured to, with the at least one processor, cause an apparatus, e.g. apparatus 700 at least to perform and/or control the method according to second exemplary aspect of the invention.

Processor 710 may for instance comprise a radio measurer 711 as a functional and/or structural unit. Radio measurer 711 may for instance be configured to gather one or more respective radio measurements (see step 211 of FIG. 2). Processor 710 may for instance further control the memories 720 to 740, the communication interface(s) 750, the optional user interface 760 and the optional sensor(s) 770.

Processor 710 may for instance execute computer program code stored in program memory 760, which may for instance represent a computer readable storage medium comprising program code that, when executed by processor 710, causes the processor 710 to perform the method according to the second aspect.

Processor 710 (and also any other processor mentioned in this specification) may be a processor of any suitable type. Processor 710 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 710 may for instance be an application processor that runs an operating system.

Program memory 760 may also be included into processor 710. This memory may for instance be fixedly connected to processor 710, or be at least partially removable from processor 710, for instance in the form of a memory card or stick. Program memory 760 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 760 may also comprise an operating system for processor 710. Program memory 760 may also comprise a firmware for apparatus 700.

Apparatus 700 comprises a working memory 720, for instance in the form of a volatile memory. It may for instance be a Random Access Memory (RAM) or Dynamic RAM (DRAM), to give but a few non-limiting examples. It may for instance be used by processor 710 when executing an operating system and/or computer program.

Data memory 740 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 740 may for instance store one or more pieces of position information.

Communication interface(s) 750 enable apparatus 700 to communicate with other entities, e.g. with server 110 of FIG. 1, or with central device 150 of FIG. 1, and/or with terminal 130 of FIG. 1. The communication interface(s) 750 may for instance comprise a wireless interface, e.g. a cellular radio communication interface and/or a WLAN interface and/or a BLE interface and/or a UWB (Ultra Wide Band) interface (e.g. receiver) to estimate relative positions from references radio nodes) and/or wire-bound interface, e.g. an IP-based interface, for instance to communicate with entities via the Internet. Communication interface(s) may enable apparatus 700 to communicate with other entities, for instance with server 110 of FIG. 1, with central device 150 of FIG. 1, and/or with terminal 130 of FIG. 1, dependent upon if apparatus 700 represents server 110 of FIG. 1, or central device 150 of FIG. 1.

User interface 760 is optional and may comprise a display for displaying information to a user and/or an input device (e.g. a keyboard, keypad, touchpad, mouse, etc.) for receiving information from a user.

Sensor(s) 770 are optional may for instance comprise a one or more sensors, e.g. to gather additional information, e.g. pressure information usable for floor detection to name but one non-limiting example.

Some or all of the components of the apparatus 700 may for instance be connected via a bus. Some or all of the components of the apparatus 700 may for instance be combined into one or more modules.

Further, the following exemplary embodiments shall also be considered to be disclosed:

Radio fingerprinting is widely used for positioning. The fingerprinting requires collection of radio sample from the known locations of the building.

For collecting data for fingerprinting, radio surveying is widely used. The surveying has many drawbacks. Firstly, it takes significant time from a surveyor. He must walk around the whole building multiple times to collect radio samples. Additionally, the surveyed data (e.g. fingerprints) does not adapt with changes in the radio environment (e.g. infrastructure), which could happen after surveying is completed. The changes in radio environment degrade positioning quality. There are many factors which can change the radio environment of the building such as (e.g. physical) infrastructure changes, e.g. new structure is built or the old structure is destroyed, or the presence or absence of people to name but a few non-limiting examples.

Surveying is a poor method for the maintenance of radio maps. It is very difficult to maintain the quality of the radio map with the surveying approach. Service provider(s) must track changes in the building infrastructure itself, which can be very difficult. Additionally, the service provider(s) must repeat surveying campaign every time there is a change in the infrastructure of the building.

It is proposed as an exemplary aspect of the present invention a system which creates good quality radio map(s) for fingerprinting. The system is easy to setup. The system overcomes the challenges of surveying and distribution of the radio map(s). It is self-maintaining and adaptive to the changes in the radio environment.

The approach uses radio beacons (e.g. radio nodes) to collect fingerprinting data and a central device (e.g. electronic device) to collect data from surrounding beacons (e.g. radio nodes) for further processing. In this approach, radio beacons require to sense their environment and broadcast the sensed radio environment information to help the central device to learn the radio environment. The radio beacons may also be termed as mirror beacons in this specification.

A mirror beacon has one or more of the following characteristics:
  knows its location;
  aware of its surrounding, e.g. it senses surrounding radio devices with its receiver;
  saves surrounding radio environment information in its database;
  broadcast learned/stored radio environment and its location;
  the mirror beacon advertisement served as a sample radio fingerprint for other BLE devices.

A central device must have same radio as mirror beacons as well as components to distribute the collected information to other component of positioning system, e.g. servers. This distribution can be done by an internet connection or using radio-based communication to distribute the information. The system can be created by setting up a combination of central devices and mirror beacons. A central device receives radio broadcasts of all mirror beacons. Each broadcast served as a sample fingerprint. Collecting all sample fingerprints, a central device can create its own radio map or distribute this information to other components of the system. It can send the learned information to a back-end server, which can learn the radio environment and merge the data of different central devices to create a radio map with larger coverage. Or it can distribute locally created radio maps to surrounding mobile devices, which use them for positioning.

The approach of the present invention has many benefits compared to traditionally fingerprint methods:
  Adaptiveness: It is very adaptive; each mirror beacon senses the radio environment in real time and reports all possible changes in the radio environment to other devices;
  Low maintenance: Once the system has set up, a service provider does not have to track the infrastructure changes and repeating surveying campaigns to maintain positioning performance;
  Setting up the system takes less time than the surveying approach.

Technical Implementation:

One exemplary implementation of the system is explained with BLE beacons, and a central device. One example of the central device is a device which has internet connection and BLE radio. It learns the BLE radio using BLE and distributes its learned information to servers via the internet.

Creation of Mirror Beacon:

It is easy to create a mirror beacon. It consists of standard BLE technology. User defined advertisement in BLE protocol can be utilized to broadcast beacon location and learned radio environment by the mirror BLE beacon.

For the learning, the beacon can store in its memory RSS, ID (e.g. MAC address) and other advertisement data, which can help to identify surrounding devices uniquely (e.g. iBeacon or eddy stone advertisements).

Central Device:

Any device with an internet connection equipped with radio for setting positioning infra can be used as a central device. Internet can be established by cellular technology, e.g. Wi-Fi, LAN, or the like to name but a few non-limiting examples. This device aggregates all broadcast of the mirror beacons. It can then send this information to a server or a mobile device. Information send to the server can be used for a learning process of the radio map. Or it can itself process the radio environment by creating radio map and send the radio map to a mobile device to use it for positioning.

Setting Up the System:

A positioning system can be set up by distributing mirror beacons and a center device around the building and program each beacon with its location. One exemplary method to distribute beacons is to distribute them in a grid, where each beacon is approximately 10 meters apart from each other. And two center devices may be used, so that the center devices have coverage of all the beacons. FIG. 3 shows one example of distributing the beacons.

FIG. 3 shows a grid of 24 mirror BLE devices and a center device. The dots show the location of a beacon, the number on the beacon it its ID, and the stars each show a center device.

The center device collects all advertisements of surrounding mirror beacons. Each broadcast is equivalent to a single radio fingerprint. The radio fingerprint has the locations and a list of all BLE devices and RSS received at the location of the beacon. Collection of the broadcast (fingerprint samples) of the mirror BLE of surrounding mirror beacons enable a center device to create a radio map of the surrounding. The radio map is created by interpolating the fingerprints.

Example of collection of advertisements of mirror beacons is shown in the FIG. 4. FIG. 4 shows fingerprinting samples of beacon number "17" collected from different beacons by a mobile device.

FIG. 4 shows fingerprinting samples of beacon with the id "17" of FIG. 3, which fingerprinting samples are collected by a center device from surrounding mirror beacons. In the figure, the shown circles represents locations where beacon "17" advertisement was received by surrounding beacons, and the different hatchings, with which the circles are filled, indicate the RSS-value observed at the location (see also the legend at the right side of FIG. 4 showing which of the different hatchings corresponds to the observed RSS-value). This is all the information, which is required to create a radio map.

The radio map can be created from the fingerprinting samples by interpolating the signals. FIG. 5 shows the radio map of beacon number "17" created by interpolating the signal.

Distribution of Learned Data:

The distribution of the learned data is done by a center device. The center device can send the data to a back-end server, which merges data of all center devices to create a radio map of the whole building. Additionally, the center device can process the information itself and share the data with surrounding mobile devices so that they can use the radio map for positioning in the surrounding area.

The following embodiment shall also be considered to be disclosed:

A second apparatus, e.g. at least one of the radio nodes 140 of FIG. 1, has the following information which it senses by scanning other radio nodes, e.g. the other radio nodes of FIG. 1.

For instance, the sensed data, e.g. (radio) measurement is as follows in table 1:

| MAC of radio node 2 | RSS of node 2 |
| MAC of radio node 3 | RSS of node 3 |
| MAC of radio node 4 | RSS of node 4 |
| MAC of radio node 5 | RSS of node 5 |

Second apparatus (e.g. at least one of the radio nodes 140 of FIG. 1, e.g. referred to as second apparatus 1) broadcast its sensed information.

A first apparatus, e.g. one of the central devices 150 of FIG. 1, has following information which it receives by collecting all broadcast of one or more second apparatus, e.g. one or more of the radio nodes 140 of FIG. 1 (e.g. second apparatus 1), which is shown in table 2 below

| Second apparatus 1 identifier | Sensed data | |
|---|---|---|
| MAC of node 1 | MAC of node 2 | RSS of node 2 |
| | MAC of node 3 | RSS of node 3 |
| | MAC of node 4 | RSS of node 4 |
| | MAC of node 5 | RSS of node 5 |
| MAC of node 2 | MAC of node 1 | RSS of node 1 |
| | MAC of node 3 | RSS of node 3 |
| | MAC of node 4 | RSS of node 4 |
| | MAC of node 5 | RSS of node 5 |

First apparatus (e.g. first apparatus 1) can relay table 2 to another first apparatus (e.g. first apparatus 2; e.g. another central device 150 of FIG. 1), or to a first apparatus 3 (e.g. a master central device (e.g. one of the central devices 150 of FIG. 1) selected by all first apparatuses (e.g. all central devices 150 of FIG. 1; first apparatus 1 and first apparatus 2) using meshing). All first apparatuses 1, 2 and 3 have the same radio (e.g. communication according to WLAN-, BLE, and/or UWB-standard) so no internet is needed.

In the following table 3, first apparatus 3 data is shown:

| Second apparatus 1 identifier | Second apparatus sensed data | | |
|---|---|---|---|
| Second apparatus 2 MAC | MAC of node 1 | MAC of node 2 | RSS of node 2 |
| | | MAC of node 3 | RSS of node 3 |
| | | MAC of node 4 | RSS of node 4 |
| | | MAC of node 5 | RSS of node 5 |
| | MAC of node 2 | MAC of node 1 | RSS of node 1 |
| | | MAC of node 3 | RSS of node 3 |
| | | MAC of node 4 | RSS of node 4 |
| | | MAC of node 5 | RSS of node 5 |
| | . | . | . |
| | . | . | . |
| | . | . | . |
| First apparatus 2 MAC | MAC of node 6 | MAC of node 5 | RSS of node 5 |
| | | MAC of node 7 | RSS of node 7 |
| | | MAC of node 8 | RSS of node 8 |
| | | MAC of node 9 | RSS of node 9 |
| | MAC of node 7 | MAC of node 6 | RSS of node 6 |
| | | MAC of node 5 | RSS of node 5 |
| | | MAC of node 8 | RSS of node 8 |
| | | MAC of node 9 | RSS of node 9 |

First apparatus (e.g. one of the central devices 150 of FIG. 1) are planned to receive all data from all radio nodes (e.g. all radio nodes 140 of FIG. 1).

First apparatus 2/first apparatus 3 can also share table 2/table 3 with an apparatus 4, e.g. a back end (e.g. server 110 of FIG. 1). This requires internet connection (e.g. via communication network 170 of FIG. 1).

Fingerprint is generated by associating sensed signal of table 1 with a radio node reference location. The reference location can be stored in at least one of the apparatuses (e.g. first apparatus (e.g. central device 150 of FIG. 1), second apparatus (e.g. radio node 140 of FIG. 1), back end (e.g. server 110 of FIG. 1)). Thus, fingerprint can be generated by any apparatus which has reference location.

Second apparatus 1 (e.g. a radio node 140 of FIG. 1) can generate its own fingerprint if it has its own reference location in its memory.

First apparatus 2 (e.g. a central device 150 of FIG. 1) can generate fingerprints by associating all second apparatus 1 (e.g. radio nodes 140 of FIG. 1) which it has in table 2 with their reference locations which is stored in its memory.

One example of reference locations of second apparatus 1 is in table 4, which is shown in the following comprising reference locations of beacons:

| Second apparatus 1 identifier | Reference location (3-dimensional) |
|---|---|
| MAC of node 1 | Location of MAC 1 [x1, y1, z1] |
| MAC of node 2 | Location of MAC 2 [x2, y2, z2] |
| MAC of node 3 | Location of MAC 3 [x3, y3, z3] |
| MAC of node 4 | Location of MAC 4 [x4, y4, z4] |
| MAC of node 5 | Location of MAC 5 [x5, y5, z5] |

First apparatus 3 (e.g. master central device, e.g. one of the central devices 150 of FIG. 1) can generate fingerprints by associating reference locations to radio nodes and their sensed signals which it receives from all first apparatuses 2.

Apparatus 4 (e.g. back-end; e.g. server 110 of FIG. 1) can generate fingerprints by associating reference locations and sensed radio measurements of second apparatus 1 (e.g. at least one of the radio nodes 140 of FIG. 1) it receives.

Radio map is generated by combining fingerprints. Radio map can be generated by the first apparatus (e.g. one of the center devices 150 of FIG. 1) which has two or more fingerprints.

First apparatus 2 can generate partial radio map of all beacons (e.g. radio nodes 140 of FIG. 1) in its coverage.

First apparatus 3 (a determined master central device; e.g. one of the central devices 150 of FIG. 1) can generate complete radio map of all beacons.

Apparatus 4 (e.g. back-end; e.g. server 110 of FIG. 1) can generate a complete radio map of all beacons.

Distribution of radio map is done so that mobile devices (e.g. terminals 130 of FIG. 1) can use radio maps to estimate their positions.

Second apparatus 1 (e.g. at least one of the radio nodes 140 of FIG. 1) can be programmed to distribute its own radio map which it will receive from first apparatus 2 it is associated with. One method of distribution is broadcasting its own radio map.

First apparatus 2 (e.g. a central device 150 of FIG. 1) can distribute radio maps of all second apparatuses 1 in its range. First apparatus 2 can use the same radio or optionally a different radio for the distribution of the radio maps e.g. Wi-Fi by making intranet connection with a mobile device (e.g. terminal 130 of FIG. 1).

First apparatus 3 (a determined master central device; e.g. one of the central devices 150 of FIG. 1) can distribute the radio map of all radio nodes by making for example Wi-Fi intranet connection.

Apparatus 4 (e.g. back-end; e.g. server 110 of FIG. 1) can distribute the radio map of all radio nodes via internet.

The following advantages of the present invention according to all aspects may be achieved:

Adaptive: The positioning system is very adaptive; each mirror beacon sense the radio environment in real time and report all possible changes in radio environment to other devices;

Radio samples collected by the device from beacons reflect the true surrounding of the environment which helps positioning algorithm to estimate a device location very accurately;

Low maintenance: Once the system has set up, a service provider does not have to track infrastructure changes and repeating surveying campaigns to maintain positioning performance;

Setting up the system takes less time than surveying approach.

In the present specification, any presented connection in the described embodiments is to be understood in a way that the involved components are operationally coupled.

Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A first apparatus comprising at least one processor and at least one memory including computer program code, the at least one memory and the computer program code configured to, with the at least one processor, cause the first apparatus to at least perform:
  obtaining one or more first fingerprints, which stem from one or more radio nodes comprised by an infrastructure of a venue, and wherein the one or more radio nodes are surrounding the first apparatus so that the first apparatus is located within each respective coverage area of the one or more radio nodes, wherein the one or more first fingerprints are obtained by either (a) receiving one or more respective radio measurements, wherein one or more respective radio measurements are gathered by one or more radio nodes, and generating the one or more first fingerprints based at least partially on the obtained one or more respective radio measurements and on one or more pieces of position information, wherein the one or more pieces of position information are indicative of the respective location of the one or more radio nodes from which the one or more respective radio measurements were obtained or (b) receiving the one or more first fingerprints;
  generating a radio map based at least partially on the one or more first fingerprints; and
  outputting the generated radio map.

2. The first apparatus according to claim 1, wherein at least two first fingerprints are obtained, wherein at least one first fingerprint of the at least two first fingerprints is obtained by step i) and at least one other first fingerprint of the at least two first fingerprints is obtained by step ii).

3. The first apparatus according to claim 1, wherein the at least one memory and the computer program code are configured to, with the at least one processor, cause the first apparatus further to perform:
  gathering one or more second fingerprints, wherein the one or more second fingerprints are gathered based at least partially on one or more signals sent by one or more radio nodes surrounding the first apparatus; and
  wherein the radio map is generated based at least partially on the obtained one or more second fingerprints.

4. The first apparatus according to claim 1, wherein each respective first fingerprint of the one or more first fingerprints comprises at least one received signal strength value of one or more surrounding radio nodes of the radio node, which gathered the respective first fingerprint.

5. The first apparatus according to claim 2, wherein the at least one memory and the computer program code are configured to, with the at least one processor, cause the first apparatus further to perform prior to generating the radio map:
  interpolating such parts of the generated radio map of the venue, with which no first and/or second fingerprints are associated;
  wherein the interpolated radio map is outputted.

6. The first apparatus according to claim 1, wherein the radio map is outputted to another first apparatus, wherein the other first apparatus generates a further radio map based at least partially on the outputted radio map and at least one further radio map of the venue obtained by the other first apparatus.

7. The first apparatus according to claim 1, wherein the radio map is generated by associating each respective fingerprint with a grid-like arrangement of the radio map, wherein the grid-like arrangement comprises a plurality of grid-points distributed across a map of the venue, and wherein each respective fingerprint is associated with the grid-point corresponding to the location of the piece of position information comprised by each respective fingerprint.

8. The first apparatus according claim 1, wherein the one or more pieces of position information are obtained by calculating a relative distance from at least one reference point, wherein the at least one reference point is received.

9. A second apparatus comprising at least one processor and at least one memory including computer program code, the at least one memory and the computer program code configured to, with the at least one processor, cause the apparatus to at least perform:
  gathering one or more respective radio measurements in a venue, wherein one or more respective signals are sent by one or more respective radio nodes surrounding the second apparatus, wherein each respective radio measurement of the one or more respective radio measurements is indicative of at least one respective piece of identifier information which is associated with the one or more respective radio nodes surrounding the second apparatus, and wherein each of the one or more radio nodes surrounding the respective radio node is uniquely identifiable based at least partially on the at least one respective piece of identifier information;
  obtaining a piece of position information, wherein the piece of position information is indicative of the location of the second apparatus in the venue; and
  broadcasting the one or more respective radio measurements and position information together to form a fingerprint, wherein the one or more respective fingerprints are configured to be communicated and recorded amongst apparatuses.

10. The second apparatus according to claim 9, wherein at least one respective radio node of the one or more respective radio nodes surrounding the second apparatus is a radio node not capable of broadcasting the one or more respective radio measurements.

11. A first method, performed by at least one first apparatus, comprising:
  obtaining one or more first fingerprints, which stem from one or more radio nodes comprised by an infrastructure of a venue, and wherein the one or more radio nodes are surrounding the first apparatus so that the first apparatus is located within each respective coverage area of the one or more radio nodes, wherein the one or more first fingerprints are obtained by either (a) receiving one or more respective radio measurements, wherein one or more respective radio measurements are gathered by one or more radio nodes, and generating the one or more first fingerprints based at least partially on the obtained one or more respective radio measurements and on one or more pieces of position information, wherein the one or more pieces of position information are indicative of the respective location of the one or more radio nodes from which the one or more respective radio measurements were obtained or (b) receiving the one or more first fingerprints;

generating a radio map based at least partially on the one or more first fingerprints; and outputting the generated radio map.

12. The first method according to claim 11, wherein at least two first fingerprints are obtained, wherein at least one first fingerprint of the at least two first fingerprints is obtained by step i) and at least one other first fingerprint of the at least two first fingerprints is obtained by step ii).

13. The first method according to claim 11, further comprising:

gathering one or more second fingerprints, wherein the one or more second fingerprints are gathered based at least partially on one or more signals sent by one or more radio nodes surrounding the first apparatus; and wherein the radio map is generated based at least partially on the obtained one or more second fingerprints.

14. The first method according to claim 11, further comprising:

interpolating such parts of the generated radio map of the venue, with which no first and/or second fingerprints are associated;

wherein the interpolated radio map is outputted.

15. The first method according to claim 11, wherein the radio map is outputted to another first apparatus, wherein the other first apparatus generates a further radio map based at least partially on the outputted radio map and at least one further radio map of the venue obtained by the other first apparatus.

16. The first method according to claim 11, wherein the radio map is generated by associating each respective fingerprint with a grid-like arrangement of the radio map, wherein the grid-like arrangement comprises a plurality of grid-points distributed across a map of the venue, and wherein each respective fingerprint is associated with the grid-point corresponding to the location of the piece of position information comprised by each respective fingerprint.

17. The first method according to claim 11, wherein the one or more pieces of position information are obtained by calculating a relative distance from at least one reference point, wherein the at least one reference point is received.

* * * * *

UNITED STATES PATENT AND TRADEMARK OFFICE
CERTIFICATE OF CORRECTION

| | |
|---|---|
| PATENT NO. | : 11,448,719 B2 |
| APPLICATION NO. | : 16/638521 |
| DATED | : September 20, 2022 |
| INVENTOR(S) | : Muhammad Irshan Khan |

It is certified that error appears in the above-identified patent and that said Letters Patent is hereby corrected as shown below:

In the Claims

In Column 32, Line 16, Claim 8, delete "according claim" and insert -- according to claim --, therefor.

Signed and Sealed this
Twelfth Day of September, 2023

Katherine Kelly Vidal
*Director of the United States Patent and Trademark Office*